United States Patent
Mihocka et al.

(10) Patent No.: US 11,163,575 B2
(45) Date of Patent: Nov. 2, 2021

(54) WIDENING MEMORY ACCESS TO AN ALIGNED ADDRESS FOR UNALIGNED MEMORY OPERATIONS

(71) Applicant: Microsoft Technology Licensing, LLC, Redmond, WA (US)

(72) Inventors: Darek Mihocka, Mercer Island, WA (US); Arun Upadhyaya Kishan, Kirkland, WA (US); Pedro Miguel Sequeira De Justo Teixeira, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 16/374,509

(22) Filed: Apr. 3, 2019

(65) Prior Publication Data
US 2020/0319888 A1 Oct. 8, 2020

(51) Int. Cl.
*G06F 9/30* (2018.01)
*G06F 9/38* (2018.01)

(52) U.S. Cl.
CPC ........ *G06F 9/3816* (2013.01); *G06F 9/30043* (2013.01)

(58) Field of Classification Search
None
See application file for complete search history.

(56) References Cited

U.S. PATENT DOCUMENTS

| 5,193,167 | A | * | 3/1993 | Sites | G06F 9/383 711/163 |
| 8,688,947 | B1 | * | 4/2014 | Kona | G06F 12/04 711/201 |
| 2008/0114968 | A1 | | 5/2008 | Gonion et al. | |
| 2017/0235557 | A1 | * | 8/2017 | Dang | G06F 8/52 717/153 |

OTHER PUBLICATIONS

"International Search Report and Written Opinion Issued in PCT Application No. PCT/US20/024761", dated Jul. 14, 2020, 15 Pages.

* cited by examiner

*Primary Examiner* — Corey S Faherty
(74) *Attorney, Agent, or Firm* — Mark K. Young; Mayer & Williams, PC

(57) ABSTRACT

Unaligned atomic memory operations on a processor using a load-store instruction set architecture (ISA) that requires aligned accesses are performed by widening the memory access to an aligned address by the next larger power of two (e.g., 4-byte access is widened to 8 bytes, and 8-byte access is widened to 16 bytes). Data processing operations supported by the load-store ISA including shift, rotate, and bitfield manipulation are utilized to modify only the bytes in the original unaligned address so that the atomic memory operations are aligned to the widened access address. The aligned atomic memory operations using the widened accesses avoid the faulting exceptions associated with unaligned access for most 4-byte and 8-byte accesses. Exception handling is performed in cases in which memory access spans a 16-byte boundary.

20 Claims, 18 Drawing Sheets

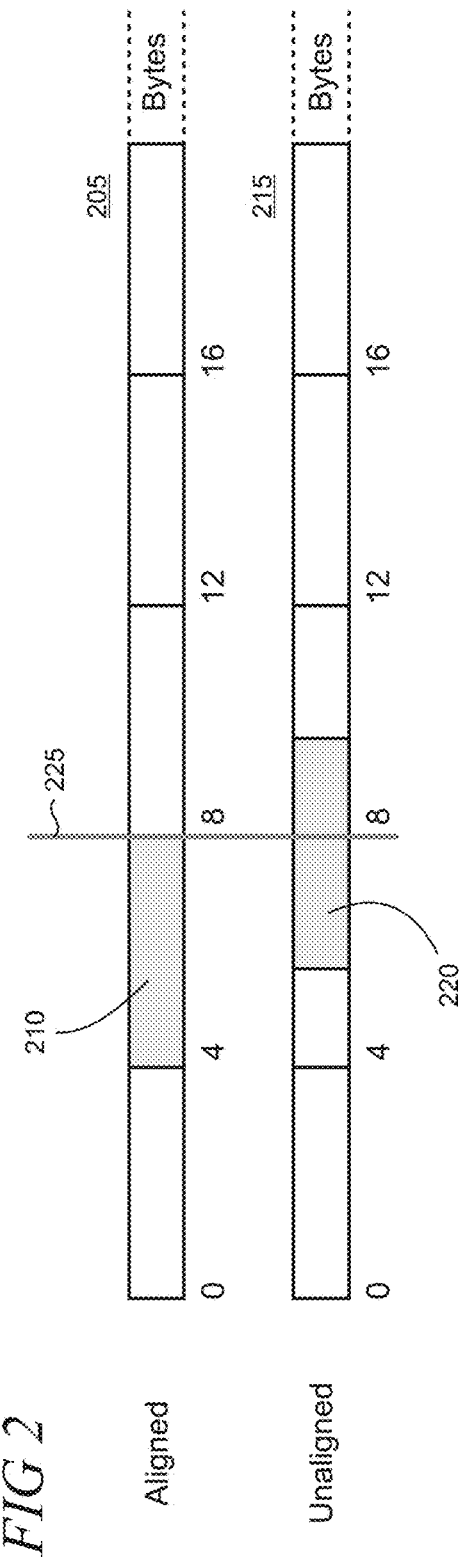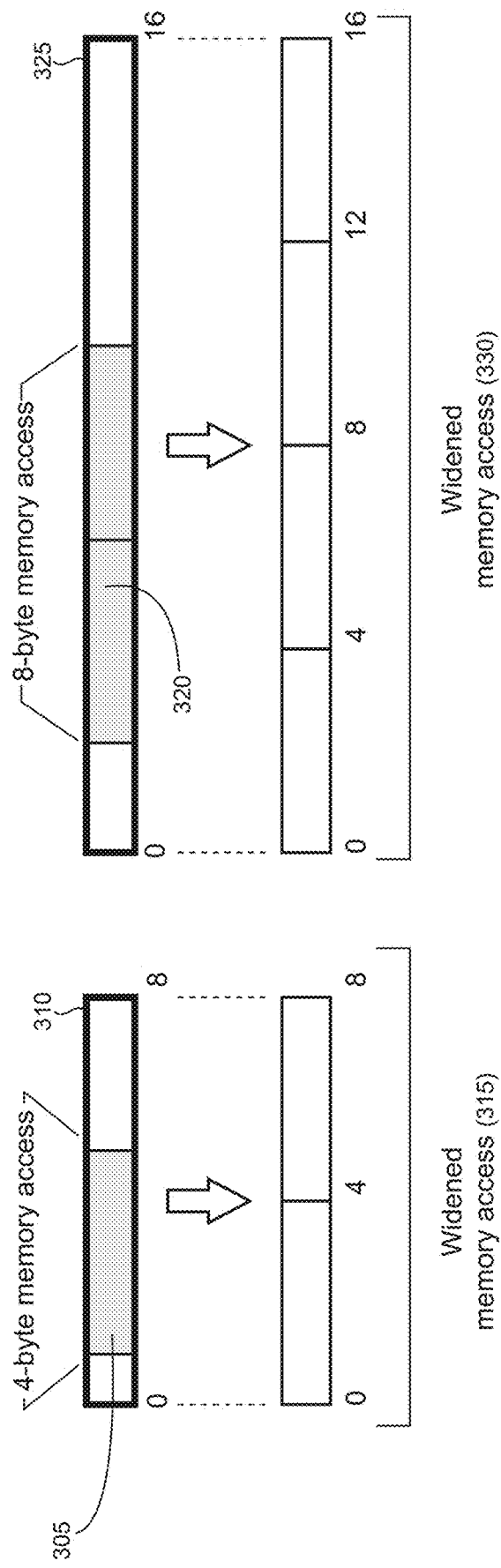

WIDENING MEMORY ACCESS TO AN ALIGNED ADDRESS FOR UNALIGNED MEMORY OPERATIONS

BACKGROUND

Common RISC (reduced instruction set computer) designs that are based on a load-store architecture such as ARM, ARM64, and PowerPC employ instruction set architectures (ISAs) that lack the general ability to perform certain memory operations at arbitrary addresses. In the case of atomic interlocked operations, for example, these architectures require that memory operations be "naturally aligned" in which 4-byte operations are performed at an address that is 4-byte aligned, 8-byte operations are performed at an address that is 8-byte aligned, and so forth. Processors employing RISC architectures will throw an exception if the atomic access is not naturally aligned.

SUMMARY

Unaligned atomic memory operations on a processor using a load-store instruction set architecture (ISA) that requires aligned accesses are performed by widening the memory access to an aligned address by the next larger power of two (e.g., 4-byte access is widened to 8 bytes, and 8-byte access is widened to 16 bytes). Data processing operations supported by the load-store ISA including shift, rotate, and bitfield manipulation are utilized to modify only the bytes in the original unaligned address so that the atomic memory operations are aligned to the widened access address. The aligned atomic memory operations using the widened accesses avoid the faulting exceptions associated with unaligned access for most 4-byte and 8-byte accesses. Exception handling is performed in cases in which memory access spans a 16-byte boundary.

In an illustrative example, the memory access widening is implemented using an emulator that operates on a computing device having a RISC-based processor. The emulator is configured to interoperate with applications executing on the computing device that utilize unaligned memory operations. For example, the applications may have been originally written for CISC (complex instruction set computer) register-memory architectures like x86, and the processor may use a RISC load-store architecture such as ARM, ARM64, PowerPC, or MIPS.

The emulator includes a memory widening component and an exception handler. The memory widening component receives unaligned x86 memory operation instructions from the applications for locking primitives on shared variables or objects in memory. For example, the instructions may include exchanging operand contents from a memory/register, exchanging and adding, comparing and exchanging, and the like. The memory widening component updates the original access to operate on widened 8-byte or 16-byte aligned memory addresses. The exception handler receives thrown exceptions and performs one or more tasks based on the exception. For example, the exception handler may handle a Load-Link/Store-Conditional exception by emulating the instruction internally to perform the memory operation. For example, exceptions can be thrown when a memory access spans an 8-byte boundary, 16-byte boundary, or memory page boundary (e.g., when the Load-Link/Store-Conditional is architecturally prohibited, or page table protections prevent access), or when access is spurious such as through an instruction that uses a bad pointer. The exception handler may ensure that the original address, and not the widened aligned address, is used in at least some propagated exceptions. In some implementations, this helps ensure the exception is correctly logged and acted upon by other processes (e.g., loggers, debuggers, interfaces, and the like).

Advantageously, the present memory access widening provides improvements to computing device performance and reduces demands on resources which can be scarce on some devices. For example, the processing cycles on the processor needed to perform most 4-byte and 8-byte accesses on the widened aligned addresses are reduced by avoiding the exception handling that is usually associated with unaligned access. In some implementations the performance improvement can be on the order of several magnitudes (e.g., 5000:1). Typically, applications are configured for multi-threaded execution while, by contrast, exception handling is performed serially on a single thread and all other application threads are suspended. Load times for x86 applications may also be improved which may reduce the computational overhead and power requirements for execution of x86 applications on ARM hardware, for example. The reduced load times may also enhance the efficiency of the human-machine interface and improve the quality of the user experiences on the computing device.

The present memory access widening further improves operation of computing devices by enhancing backward compatibility of RISC and load-store architectures, for example, in supporting non-native or legacy applications that utilize unaligned memory access operations. Such backwards compatibility can be useful to both users and platform developers—users can realize the benefits of new or different platforms while continuing to utilize non-native applications, and platform developers are able to meet the needs of a larger group of users which may motivate the development of more diverse and rich platform features.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 2 shows illustrative aligned and unaligned memory operations;

FIG. 3 shows illustrative examples of the present widening of memory access to an aligned address for unaligned memory operations;

Like reference numerals indicate like elements in the drawings. Elements are not drawn to scale unless otherwise indicated.

DETAILED DESCRIPTION

In computing science, an atomic access is an attempt to exclusively perform a read, write, or modify on shared data in storage on a computing device. Most reads and writes are atomic by default. However, in some ISAs, there are specific commands that ensure this atomicity. For example, the x86 family of ISAs uses a LOCK prefix on read-modify-write commands that are atomic. A read-modify-write command is an instruction that combines reading and arithmetic and writes the result. The ARM family of ISAs uses a Load-Link/Store Conditional command pair called load/store exclusive (LDXR/STXR) to implement aligned memory access with atomicity. Other architectures may use, for example, compare-and-swap instructions for atomic memory access. These atomic accesses take place within computer programs that are designed to run on a specific processor. For example, an x86 processor is referred to as a register-memory architecture and an ARM processor is referred to as a load-store architecture. It may be desirable to run a computer program generated for one processor on another processor that uses a different architecture, for example, to enhance backwards-compatibility of hardware and forward-compatibility of applications.

Processors are designed to operate based on their own prescribed ISA that can program the computing device. Processors can thus be programmed to perform any number of functions based on applications written for a particular ISA. It may therefore be difficult for applications written for one ISA, i.e. configured to run on one computer processor, to be installed and run on a processor that operates based on a different ISA. For example, as discussed in more detail below, the x86 ISA enables unaligned memory access for atomic operations while the ARM ISA requires aligned access and will fault on an unaligned access attempt that is mitigated on an exception basis. The present memory access widening to an aligned address for unaligned memory operations advantageously enables applications that are non-native to a computing device using a load-store ISA on the processor to run with similar efficiency as native applications when using unaligned memory access for atomic operations.

Figure 1:
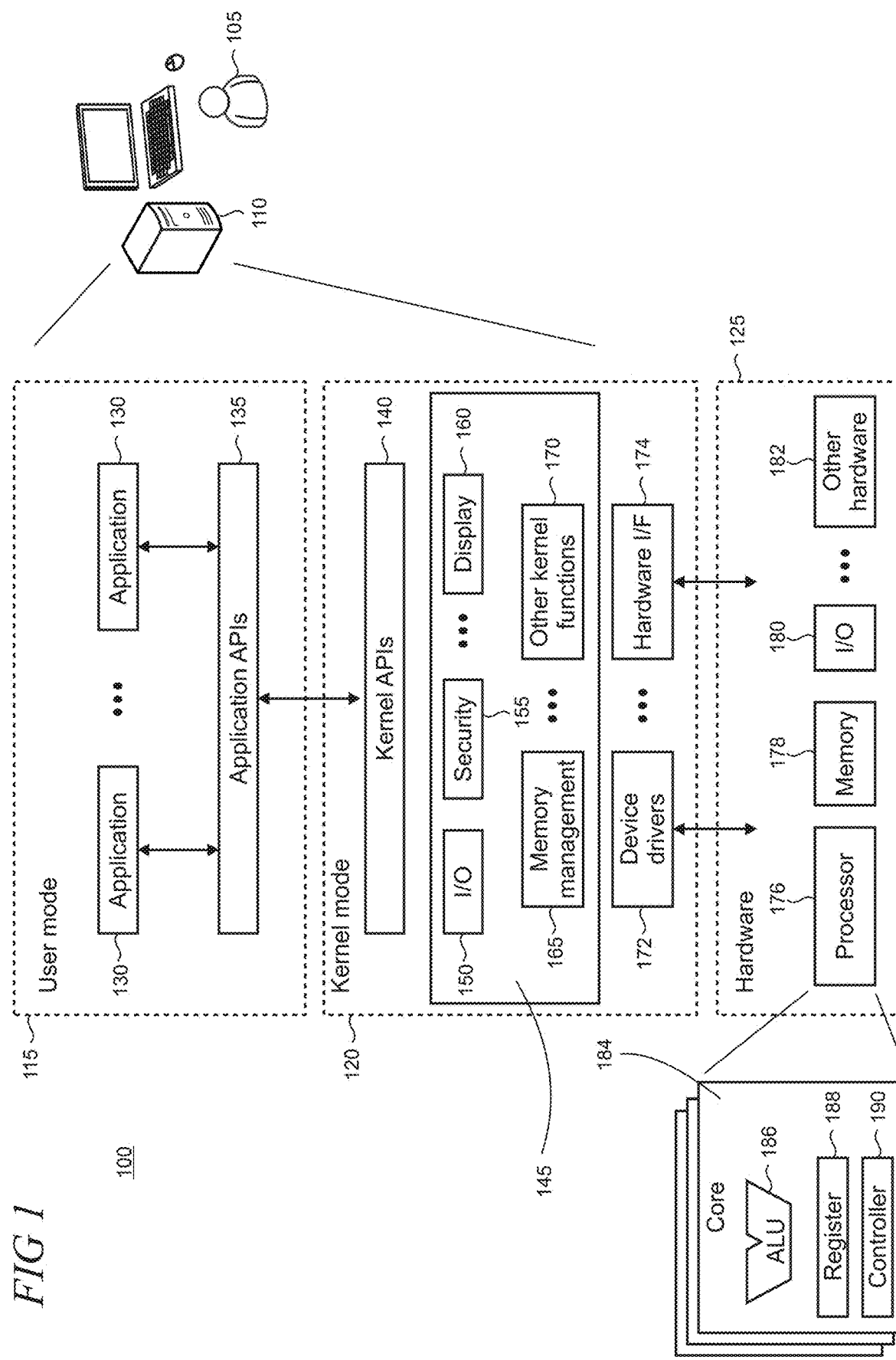
FIG. 1 shows an illustrative computing architecture.

Turning now to the drawings, FIG. 1 shows an illustrative computing architecture 100 that operates on a computing device 110 that is employed by a user 105. The architecture is layered and includes a user mode 115, a kernel mode 120, and a hardware layer 125. The user mode includes applications 130 and a set of application programming interfaces (APIs) 135 with which the applications communicate. The kernel mode is typically instantiated as part of the kernel of the operating system (OS) that operates on the computing device. The kernel includes kernel APIs 140 that arbitrate access to the kernel functions as well as various kernel functions 145, such as I/O (input/output) 150, security 155, display control 160 (e.g., access a display or monitor), memory management 165, and other privileged/kernel functions 170. The kernel typically is configured to have sole access to hardware in the hardware layer 125 via device drivers 172 and other hardware interfaces (I/F) 174.

The hardware layer 125 is below the kernel mode 120 and includes the hardware of the actual computing device 110. For example, the hardware includes one or more processor(s) 176, memory 178, I/O 180, other hardware 182, etc. In this illustrative example, the processor operates as a load-store processor under a RISC or other suitable ISA that employs aligned access for atomic memory operations that are invoked by the applications 130 or other functions and processes that execute on the computing device. In alternative implementations, the processor may be configured to utilize compare-and-swap instructions for atomic operations. The processor is configured with one or more cores 184. Each core typically comprises a plurality of arithmetic logic units (ALUs) 186 and associated registers 188 and controllers 190.

FIG. 2 shows illustrative aligned and unaligned memory operations. In memory 205 a 4-byte access 210 at bytes 4 through 7 is naturally aligned with the corresponding four bytes of the memory. "Natural alignment" means that the access object is aligned to at least a multiple of its own size. Thus, every N byte access must be aligned on a memory address boundary of N (e.g., addr % N must be zero). By comparison, in memory 215, the 4-byte access 220 is unaligned with the memory and spans the 8-byte boundary, as indicated by reference numeral 225. As noted above, the processor 176 (FIG. 1) would throw an exception when dealing with the unaligned access.

This problem is solved by widening memory access, as illustratively shown in FIG. 3. In the 4-byte access example (as indicated by reference numeral 305), the 4 bytes are placed within a larger 8-byte block (as indicated by reference numeral 310). That 8-byte block is then written to a corresponding memory address 315 that has been widened to 8 bytes. As the 8-byte block is naturally aligned with the widened memory access, the processor will handle the operation just as it would with an instruction from the native ISA.

In the 8-byte access example (as indicated by reference numeral 320), the 8 bytes are placed within a larger 16-byte block (as indicated by reference numeral 325). The 16-byte block is then written to a corresponding memory address 330 that has been widened to 16 bytes. The present memory access widening solution may also be applicable in scenarios in which a processor imposes memory size requirements beyond natural alignment. Memory widening may be utilized when a processor, for example, imposes a 4-byte alignment requirement for an unaligned 2-byte memory access. In this case, the unaligned 2-byte access may be widened to 4 bytes so that the processor can handle the memory operation without throwing an exception. Memory access widening may further be utilized in scenarios in which the widened access may exceed a native register width supported by a given ISA.

Figure 4:
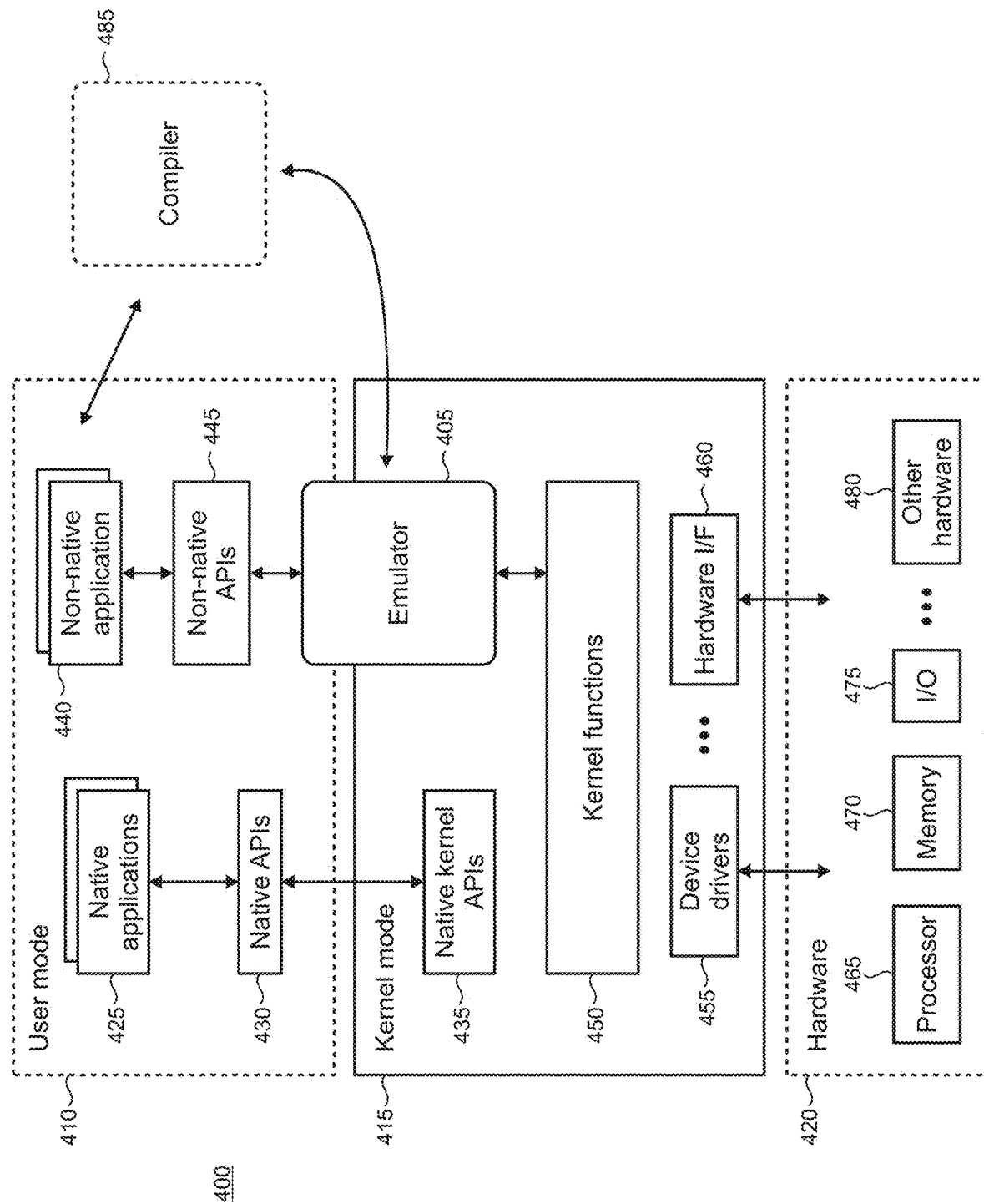
FIG. 4 shows an illustrative emulator that is configured to implement the present memory access widening to an aligned address for unaligned memory operations.

FIG. 4 shows an illustrative emulator 405 that is configured to implement the present widening of memory access to an aligned address for unaligned memory operations. The emulator is part of a computing device architecture 400 that is like that shown in FIG. 1 and described in the accompanying text. The architecture is layered and includes the user mode 410, a kernel mode numeral 415, and a hardware layer 420. Native applications 425 interact with native APIs 430 in the user mode which interface with native kernel APIs 435 in the kernel mode. Non-native applications 440 interact with non-native APIs 445 in the user mode. Device drivers 455, hardware I/F 460, processor 465, memory 470, I/O 475, and other hardware 480 are also supported by the architecture 400.

The emulator 405 may be configured to operate in the user mode 410 or kernel mode 415, or any combination of both user mode and kernel mode as illustratively shown in FIG. 4. The emulator interfaces between the non-native APIs 445 and kernel functions 450 in the kernel mode. As described in more detail below, the emulator includes functions configured for memory access widening and exception handling. In alternative arrangements, those functions may be implemented in native code in the architecture 400 or by using an external resource such as a compiler 485. The compiler may be configured to compile non-native application code that is arranged to perform one or more of the emulation functions described herein. In other alternative arrangements, some or all of the functions of the emulator may be performed remotely or in some combination of local and remote processing.

Figure 5:
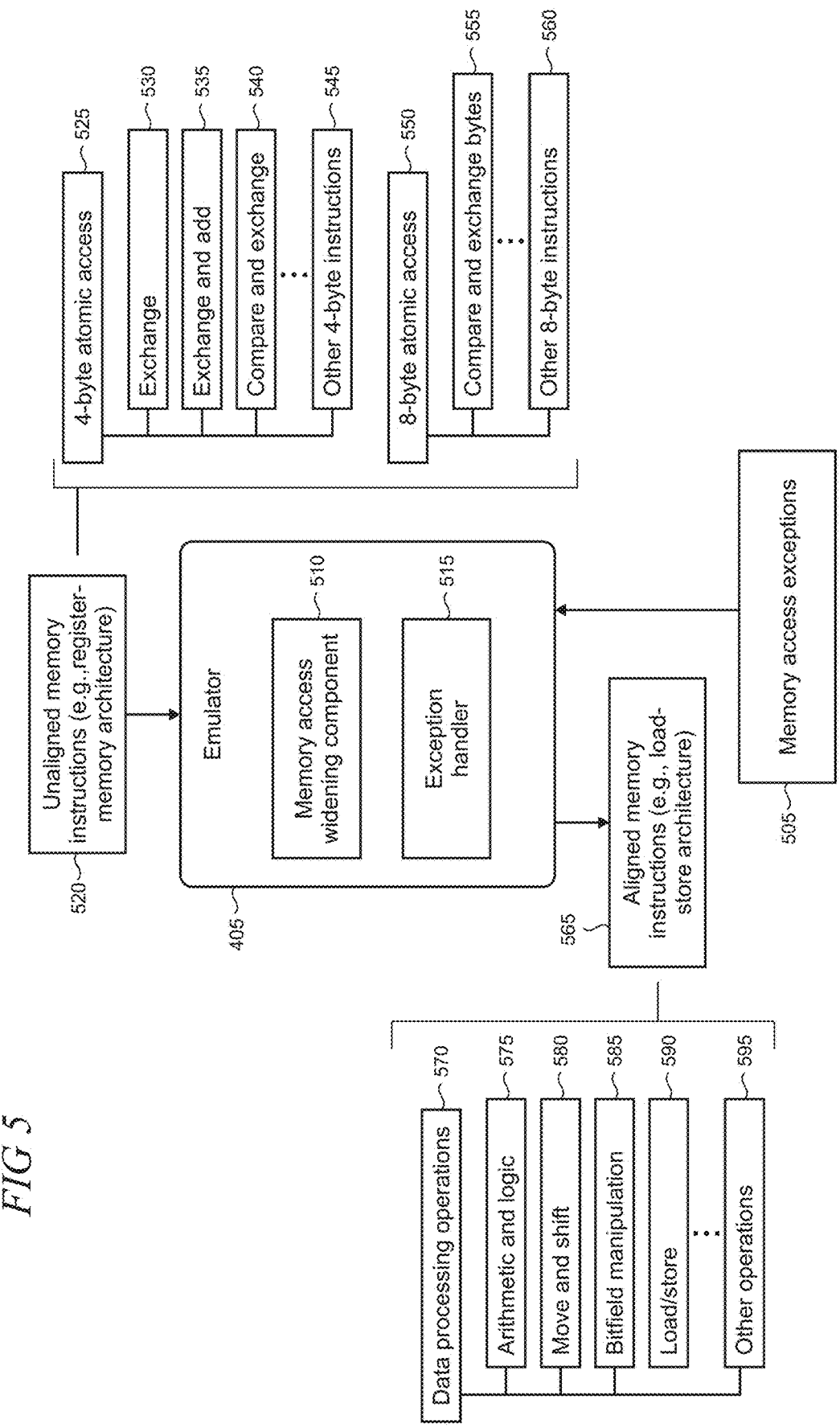
FIG. 5 shows operational details of an illustrative emulator.

FIG. 5 shows illustrative operational details of the emulator 405. As shown, the emulator comprises a memory access widening component 510 and an exception handler 515. The emulator receives instructions 520 for unaligned memory operations from the non-native applications 440 (FIG. 4) space (e.g., applications that were written in accordance with a register-memory architecture such as the x86 ISA). The instructions illustratively include 4-byte atomic access operations 525 including, for example, exchange 530, exchange and add 535, compare and exchange 540, and other 4-byte instructions 545. In the x86 ISA, these instructions would respectively include XCHG, XADD, and CMPXCHG. The instructions 520 further illustratively include 8-byte atomic access operations 550 including compare and exchange bytes 555 and other 8-byte instructions 560. In the x86 ISA, instruction 555 is CMPXCHG8B.

The emulator 405 implements aligned memory instructions 565 that are compliant with the load-store architecture of the processor 465 (FIG. 4). The instructions implement various data processing operations 570 which illustratively include arithmetic and logic 575, move and shift 580, bitfield manipulation 585, load/store operations 590, and other operations 595. The emulator is also configured to receive memory access exceptions 505 that may be thrown during memory access operations. Exception handling is described in more detail in the text accompanying FIG. 13 below.

Figure 6:
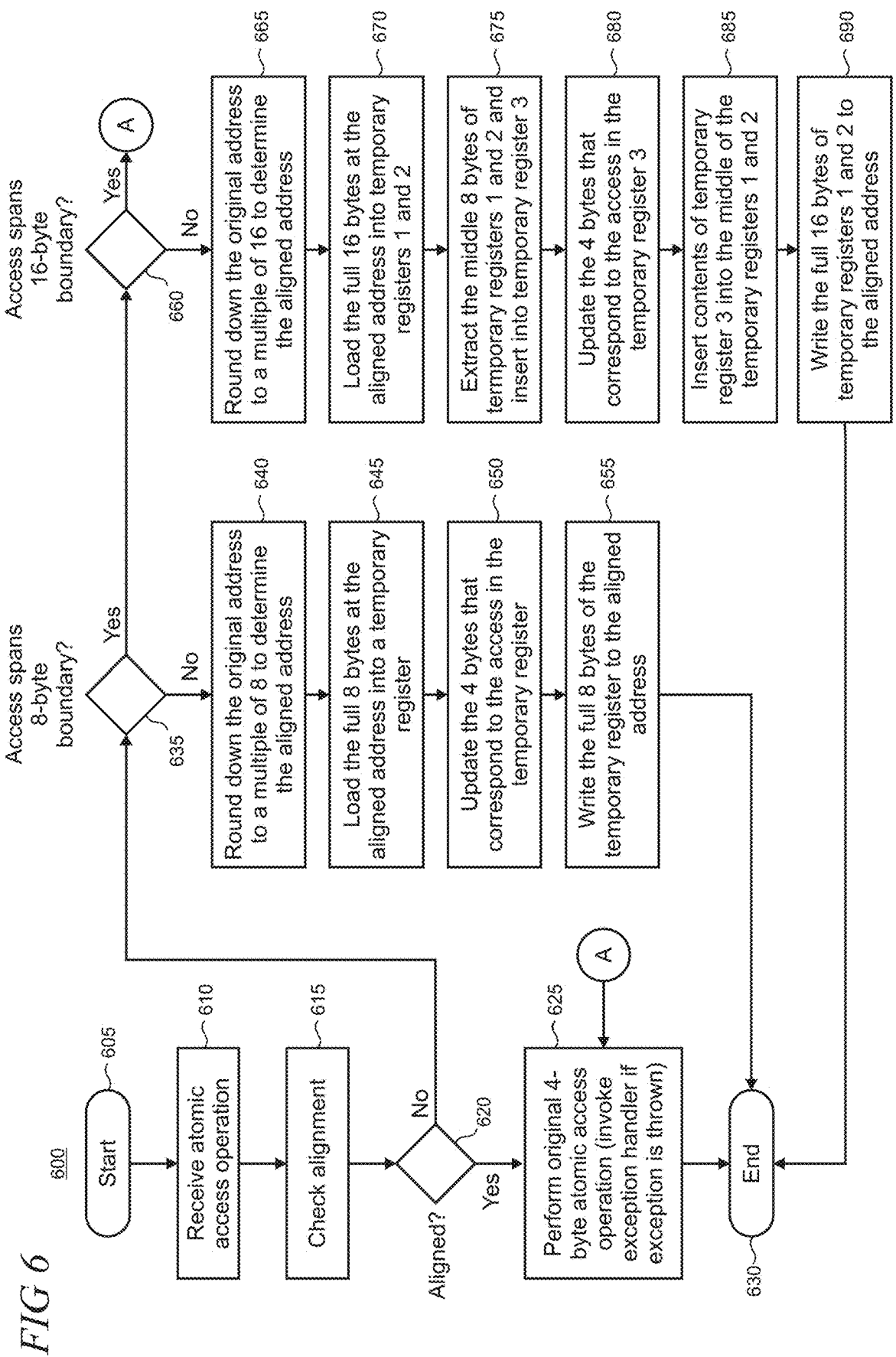
FIG. 6 is an illustrative flowchart for memory access widening for 4-byte access.

FIG. 6 is an illustrative flowchart 600 for memory access widening for 4-byte access that is illustratively performed by the emulator 405 (FIG. 4), using an example ISA having 8-byte registers. The memory access widening process starts at block 605. At block 610, an atomic access operation is received from a non-native application 440 (FIG. 4) that includes an original address that has an arbitrary alignment. The emulator checks memory access alignment at block 615 by examining the low 2 bits of the original address for zero values. At decision block 620, if the access is aligned, then at block 625 the original 4-byte atomic access operation is performed. In some cases (as described below) an exception may be thrown when this operation is performed. If so, the exception handler 515 (FIG. 5) is invoked. The process ends at block 630.

If at decision block 620 the access is unaligned, control is passed to decision block 635 where the emulator 405 determines whether the access spans an 8-byte boundary by determining if bit 2 in the original address is set. If access does not span the 8-byte boundary, control passes to block 640 where the original address is rounded down, in this illustrative example, to a multiple of 8 to determine the aligned address (e.g., AlignedAddress=OriginalAddress & 0xfffffff8; Alternative code may be AlignedAddress=OriginalAddress & (~((size_t)alignment_required−1)). More generally, the aligned address may be rounded down to a multiple of $2^W$ responsive to the original address spanning a $2^W$ boundary in the memory where $2^W$ is a size in bytes of a maximum atomic memory operation that is performable on the processor.

At block 645, the full 8 bytes at the aligned address are loaded into a temporary register. At block 650, the 4 bytes corresponding to the original access are updated in the temporary register (e.g., by operation of the x86 XCHG instruction). At block 655, the full eight bytes of the temporary register are written to the aligned address using, for example, the Store-Conditional instruction STXR, and the process ends at block 630. In some implementations, the values at the byte positions in the temporary register for the widened access at the aligned address (e.g., those exclusive of the 4 bytes of the original access) may be preserved or stored.

If at decision block 635 it is determined that access spans the 8-byte boundary, then control passes to block 660. The emulator 405 determines whether the access spans a 16-byte boundary by determining if bit 3 in the original address is set. If the access spans the 16-byte boundary, then this is considered an edge case and control passes to block 625 where the 4-byte operation is performed at its original unaligned address which can be expected to throw an exception. If the access does not span the 16-byte boundary, then control passes to block 665 where the original access address is rounded down to a multiple of 16 to determine the aligned address (e.g., AlignedAddress=OriginalAddress & 0xfffffff0).

At block 670, the full 16 bytes at the aligned address are loaded into a pair of 8-byte temporary registers, temp1 and temp2 using for example, the Load-Link instruction LDXR. Other temporary register configurations may be utilized in cases in which an ISA uses a native register width greater than 8 bytes. For example, if the native register width is 16 bytes, then a single register may be utilized instead of the pair of 8-byte registers as in this illustrative example. The middle eight bytes of the temporary registers temp1 and temp2 are extracted and inserted into a third temporary register temp3 at block 675. At block 680, the 4 bytes corresponding to the original access are updated in the temporary register temp3 (e.g., by operation of the x86 XCHG instruction). At block 685, the updated contents of the temporary register temp3 are inserted back into the middle of the temporary registers temp1 and temp2. At block

690, the full 16 bytes of the temporary registers temp1 and temp2 are written to the aligned address using, for example, the Store-Conditional instruction STXR. The process ends at block 630. In some implementations, the values at the byte positions in the temporary registers temp1 and temp2 for the widened access at the aligned address (e.g., those exclusive of the 4 bytes of the original access) may be preserved or stored.

Figure 7:
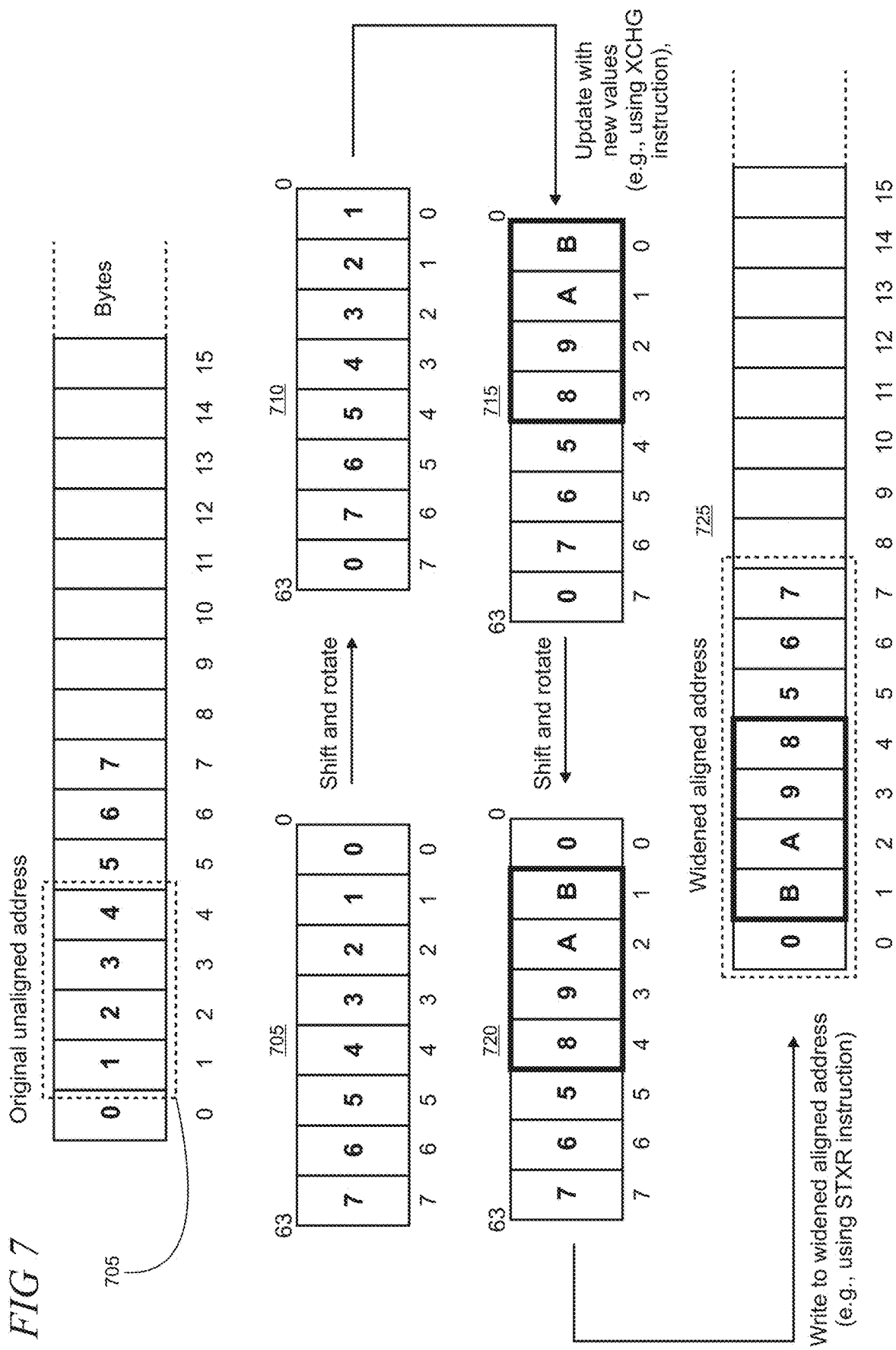
FIG. 7 shows an illustrative example of memory access widening for 4-byte access.

FIG. 7 shows an illustrative example of memory access widening for 4-byte access. In this example, the original access address 705 is unaligned by 1 byte (the illustrative values are indicated by bold type and correspond to byte location). Rounding down the original address indicates an aligned address beginning at byte 0. The full 8-bytes at the aligned address (values 0-7) are loaded into the temporary register 710 using, for example, the Load-Link instruction LDXR (the value order is reversed in the register, as shown).

A shift and rotate operation under the load-store ISA is performed so that the register is altered as indicated by reference numeral 710. The values in the original access are then updated (e.g. through operation of instruction XCHG), as indicated by reference numeral 715. Another shift and rotate operation is performed on the temporary register to shift the updated values to their corresponding location in the original access, as indicated by reference numeral 720. The full 8-bytes of the temporary register are then written to the widened aligned address in memory, as shown by reference numeral 725. For example, the writing to memory is implemented using a corresponding Store-Conditional instruction (e.g., STXR).

Figure 8:
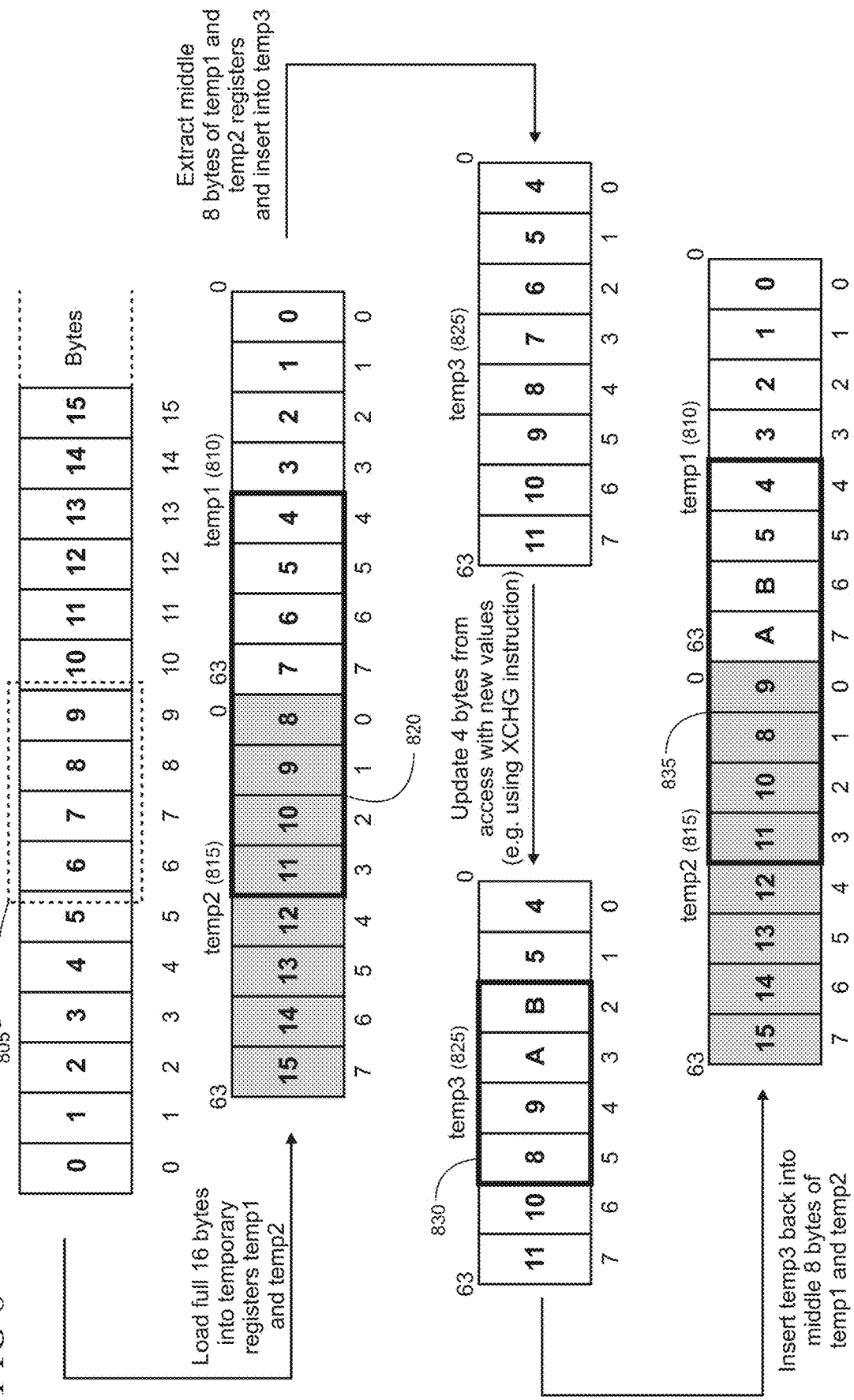
FIGS. 8 and 9 show an illustrative example of memory access widening for 4-byte access that spans an 8-byte boundary.
Figure 9:
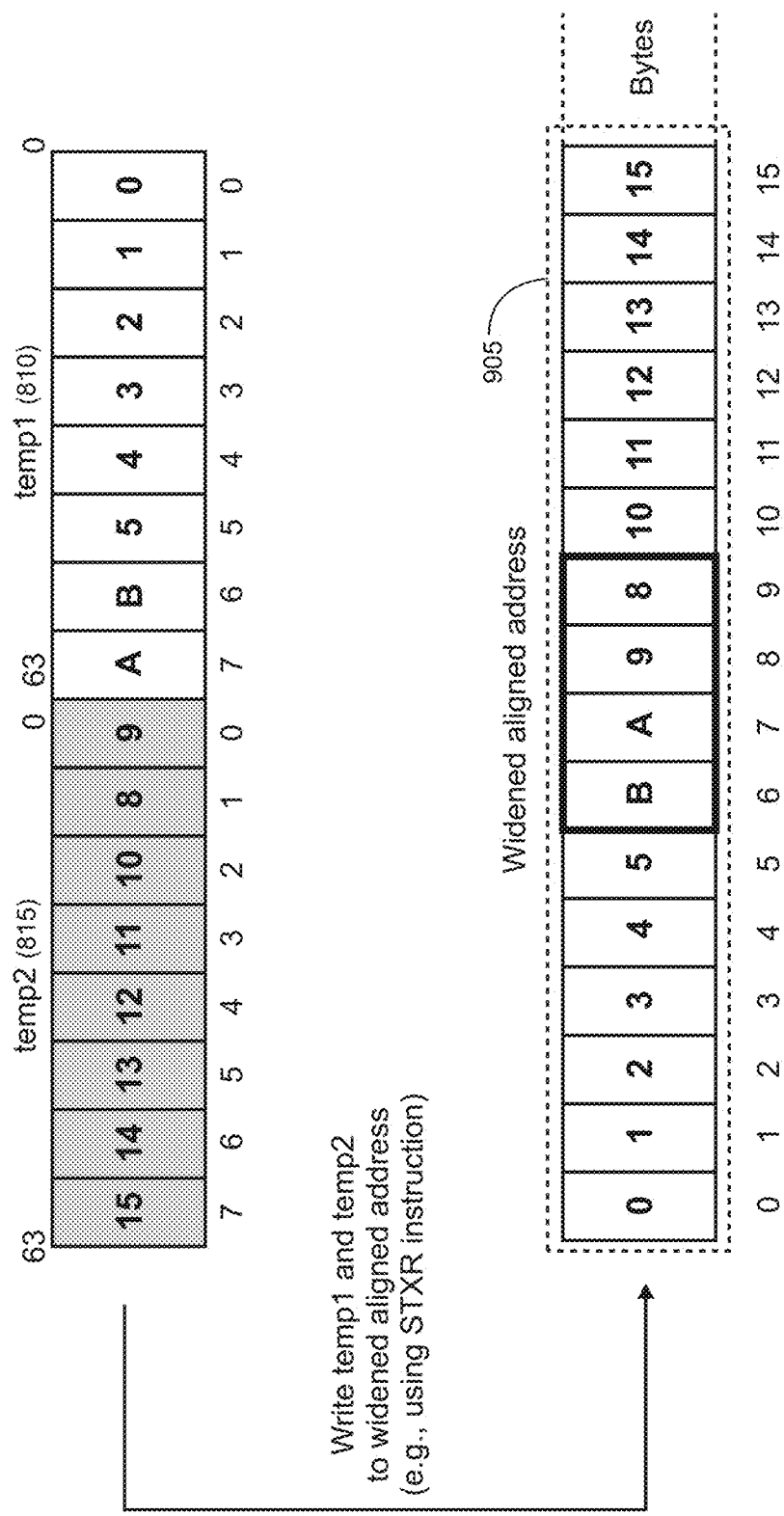

FIGS. 8 and 9 show an illustrative example of memory access widening for 4-byte access that spans an 8-byte boundary. The ISA in this example has 8-byte registers A full 16 bytes of memory access, including the original unaligned address 805, are loaded into a pair of temporary registers temp1 and temp2, as respectively indicated by reference numerals 810 and 815. Other temporary register configurations may be utilized in cases in which an ISA uses a native register width greater than 8 bytes. For example, if the native register width is 16 bytes, then a single register may be utilized instead of the pair of 8-byte registers as in this illustrative example. The middle 8 bytes shared between the temporary registers temp1 and temp2, as indicated by reference numeral 820, are extracted and inserted into a temporary register, temp3 825, using bitfield extract and insert operations supported by the load-store ISA.

The 4 bytes corresponding to the original access are updated in the temporary register temp3, as indicated by reference numeral 830, for example using the x86 XCHG instruction. The contents of the temporary register temp3 are inserted back into the middle 8 bytes of the temporary registers temp1 and temp2, as indicated by reference numeral 835. The full 16-byte contents of the combined temporary registers temp1 and temp2 are written to the widened aligned address in memory as indicated by reference numeral 905 in FIG. 9. For example, the writing to memory is implemented using the Store-Conditional instruction STXR).

Figure 10:
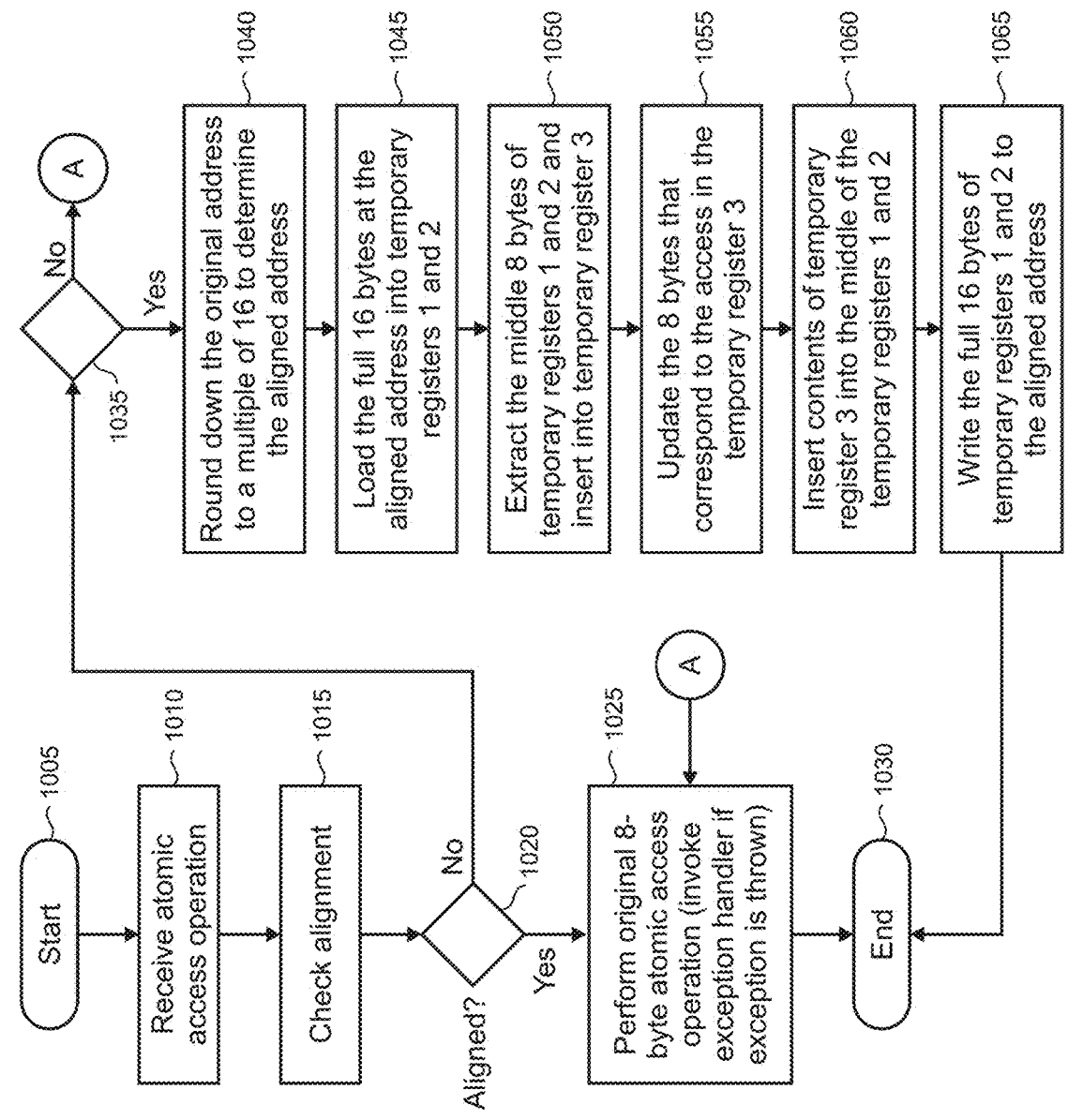
FIG. 10 is an illustrative flowchart for memory access widening for 8-byte access.

FIG. 10 is an illustrative flowchart 1000 for memory access widening for 8-byte access. The ISA in this example has 8-byte registers. The memory access widening process starts at block 1005. At block 1010, an atomic access operation is received from a non-native application 440 (FIG. 4). The emulator 405 (FIG. 4) checks memory access alignment at block 1015 by examining the low 3 bits of the original address for zero values. At decision block 1020, if the access is aligned, then at block 1025 the original 8-byte atomic access operation is performed. In some cases (as described below) an exception may be thrown when this operation is performed. If so, the exception handler 515 (FIG. 5) is invoked. The process ends at block 1030.

If at decision block 1020 the access is unaligned, control is passed to decision block 1035 where the emulator 405 determines whether the original address is 4 modulo 16. If not, control is passed to block 1025 where an exception is thrown and handled by the exception handler 515 (FIG. 5). If the original address is 4 modulo 16, then control passes to block 1040 where emulator 405 (FIG. 4) rounds down the original address to a multiple of 16 to determine the aligned address. At block 1045, the full 16 bytes at the aligned address are loaded into a pair of 8-byte temporary registers temp1 and temp2. Other temporary register configurations may be utilized in cases in which an ISA uses a native register width greater than 8 bytes. For example, if the native register width is 16 bytes, then a single register may be utilized instead of the pair of 8-byte registers as in this illustrative example. At block 1050, the middle 8 bytes of the temporary registers temp1 and temp2 are extracted and inserted into a temporary register temp3.

At block 1055, the 8 bytes corresponding to the original access are updated in the temporary register temp3 (e.g., by operation of the x86 CMPXCHG8B instruction). At block 1060, the updated contents of the temporary register temp3 are inserted back into the middle of the temporary registers temp1 and temp2. At block 1065, the full 16 bytes of the temporary registers temp1 and temp2 are written to the aligned address. The process ends at block 1030. In some implementations, the values at the byte positions in the temporary registers temp1 and temp2 for the widened access at the aligned address (e.g., those exclusive of the 8 bytes of the original access) may be preserved or stored.

Figure 11:
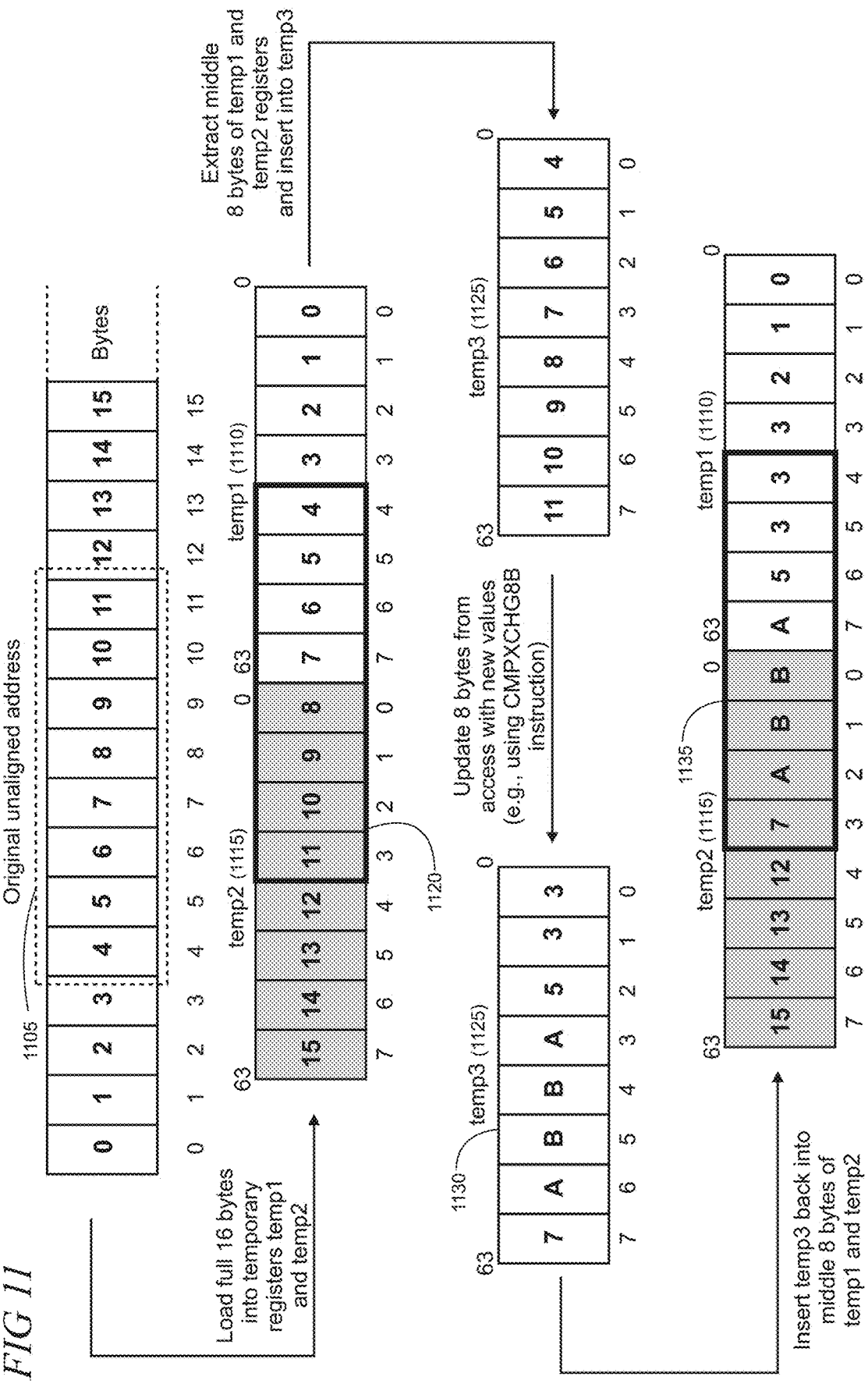
FIGS. 11 and 12 show an illustrative example of memory access widening for 8-byte access.
Figure 12:
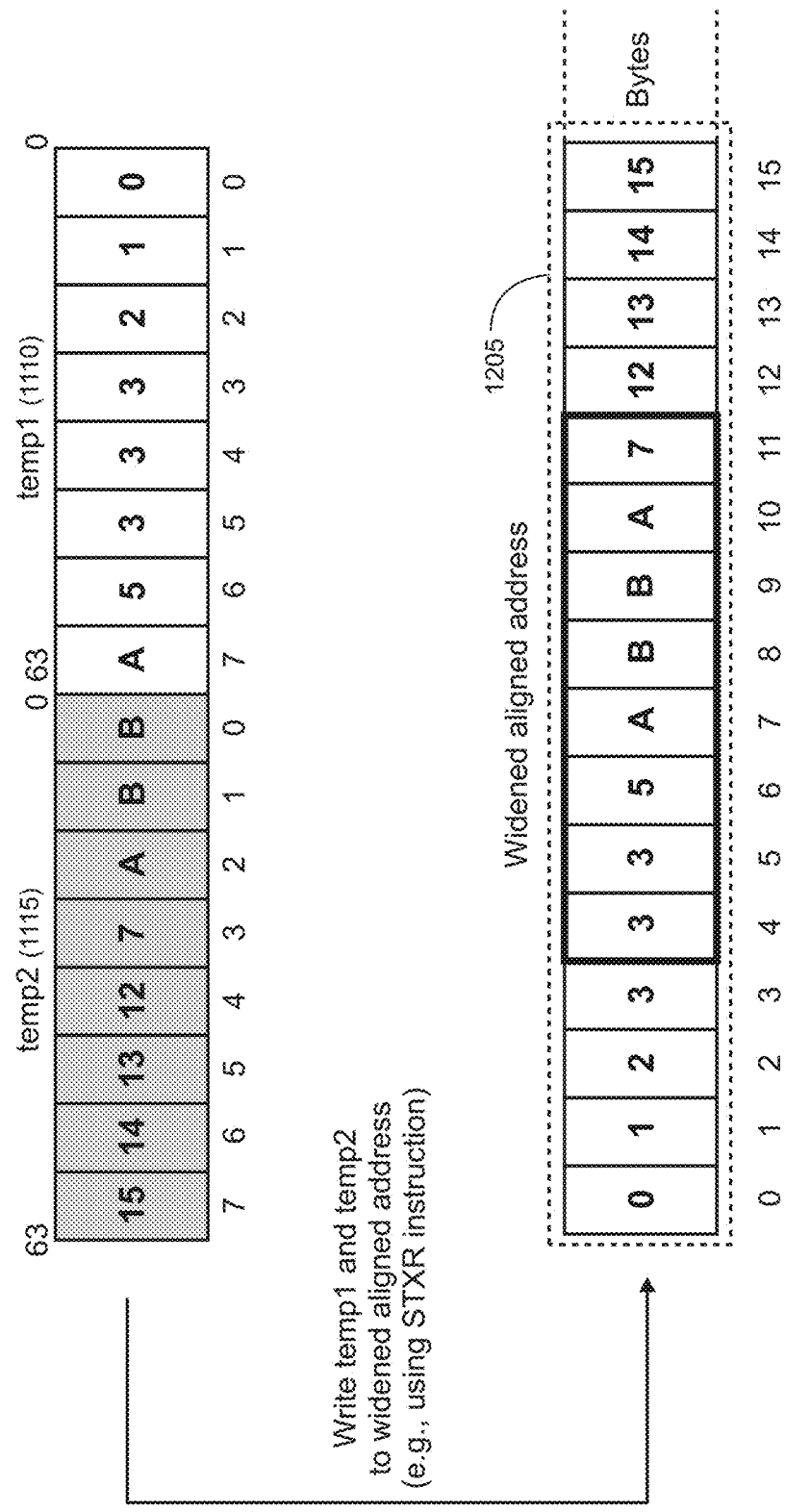

FIGS. 11 and 12 show an illustrative example of memory access widening for 8-byte access. The ISA in this example has 8-byte registers. A full 16 bytes of memory access including the original unaligned address 1105 are loaded into a pair of temporary registers, temp1 and temp2, as respectively indicated by reference numerals 1110 and 1115. These load operations may be implemented using Load-Link instructions. Other temporary register configurations may be utilized in cases in which an ISA uses a native register width greater than 8 bytes. For example, if the native register width is 16 bytes, then a single register may be utilized instead of the pair of 8-byte registers as in this illustrative example. The middle 8 bytes shared between the temporary registers temp1 and temp2, as indicated by reference numeral 1120, are extracted and inserted into a temporary register, temp3 1125, using bitfield extract and insert operations supported by the load-store ISA.

The 8 bytes corresponding to the original access are updated in the temporary register temp3, as indicated by reference numeral 1130, for example using the x86 CMPXCHG8B instruction. The contents of the temporary register temp3 are inserted back into the middle 8 bytes of the temporary registers temp1 and temp2, as indicated by reference numeral 1135. The full 16-byte contents of the combined temporary registers temp1 and temp2 are written to the widened aligned address in memory as indicated by reference numeral 1205 in FIG. 12. For example, the writing to memory may be implemented using Store-Conditional instructions (e.g., STXR) corresponding to the Load-Link instructions used to load the full 16-bytes into the temporary registers.

Figure 13:
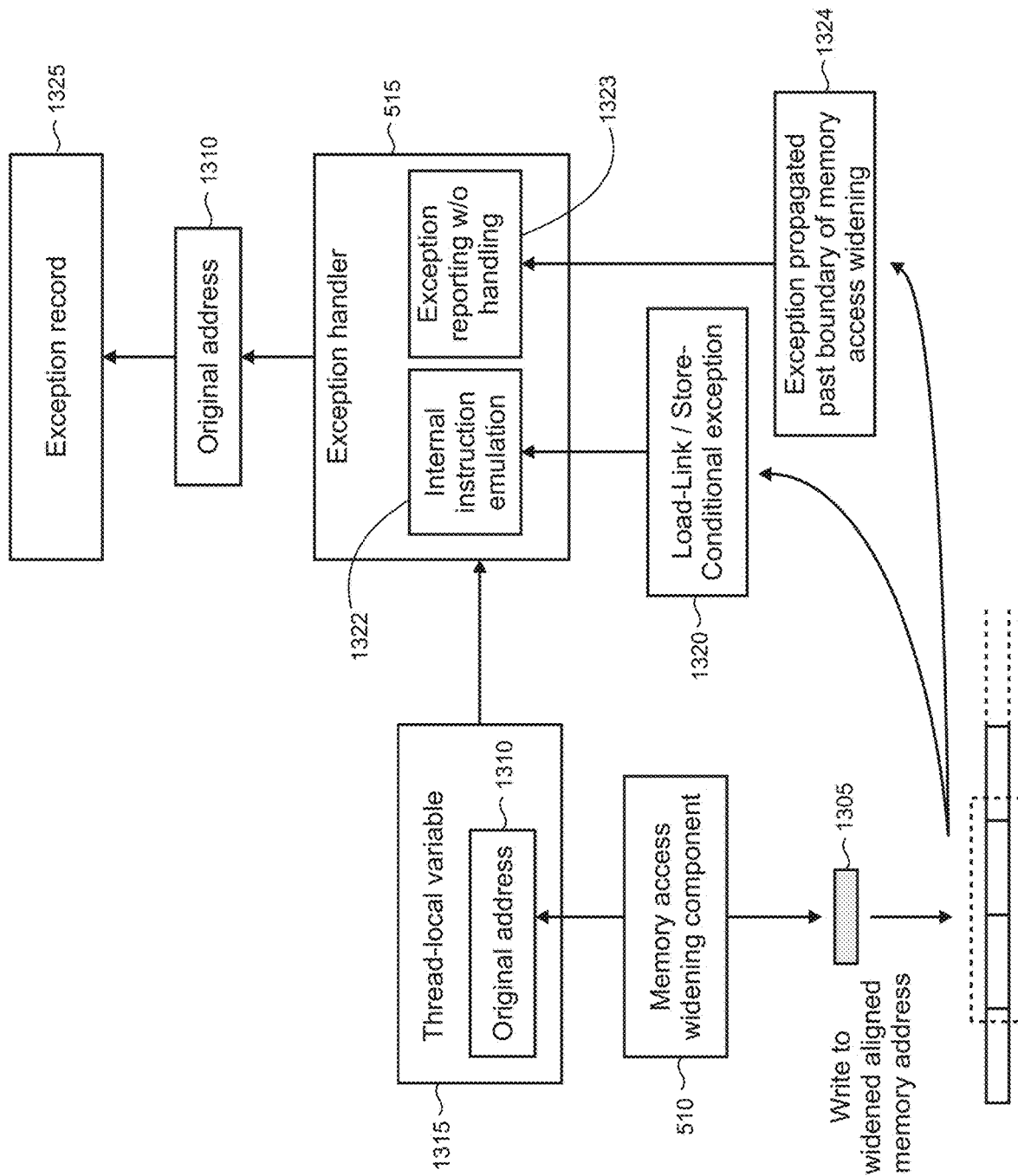
FIG. 13 shows operational details of an illustrative exception handler.

FIG. 13 shows operational details of an illustrative exception handler 515 that may be instantiated in the emulator 405

(FIG. 4). During the memory widening, the memory access widening component 510 reads and writes register contents for the widened aligned memory address 1305 using correlated Load-Link/Store-Conditional instructions (e.g., ldl_Usti_c or ldq_l/stq_c for Alpha, lwarx/stwcx or ldarx/stdcx for PowerPC, ll/sc for MIPS, ldrex/strex for ARMv6/v7, ldxr/stxr for ARMv8, lr/se for RISC-V, etc.). For each write attempt, the memory access widening component will store the original access address 1310 as a thread-local variable 1315. The exception handler receives thrown exceptions and performs one or more tasks based on the exception. For example, the exception handler is configured to manage a Load-Link/Store-Conditional exception 1320 that may be thrown during the memory widening operations as the non-native applications 440 (FIG. 4) attempt to access memory on the load-store computing device.

The exception handler 515 may handle the Load-Link/Store-Conditional exception 1320 by emulating the instruction internally to perform the memory operation from the application, as indicated by reference numeral 1322. Other exceptions 1324 from access and/or protection faults may also be thrown that propagate past the boundary of the memory widening and emulated instruction operations. Such exceptions may result, for example, when a memory access spans an 8-byte boundary, 16-byte boundary, or memory page boundary (e.g., when the Load-Link/Store-Conditional is architecturally prohibited, or page table protections prevent access), or when access is spurious such as through an instruction that uses a bad pointer. The exception handler may allow such exceptions to go unhandled, as indicated by reference numeral 1323 but can provide reporting, as discussed below.

For one or both types of exceptions (e.g., memory access and propagated exceptions) the exception handler 515 may retrieve the original access address 1310 that was stored as the thread-local variable. The exception handler can use the retrieved original access address to ensure that an exception record 1325 reports the original access address instead of reporting the aligned access address. Such reporting may improve the accuracy of both the exception handling and other processes that may utilize the exception record because the faulting typically occurs from the original access addressing. It is noted that implementations of the disclosed solution ensure that the widened aligned memory access does not cause access that crosses page-table protection boundaries, and thus a memory protection fault on the widened aligned memory access would also have caused a same type of memory protection fault on the original unaligned memory access (when using the original ISA). It is further noted that implementations of the disclosed solution may cause a predetermined type of exception to be thrown when the widened aligned memory access spans a 16-byte boundary, as well as from other faulting scenarios including, for example, spurious memory calls, incorrect pointers, and the like.

Figure 14:
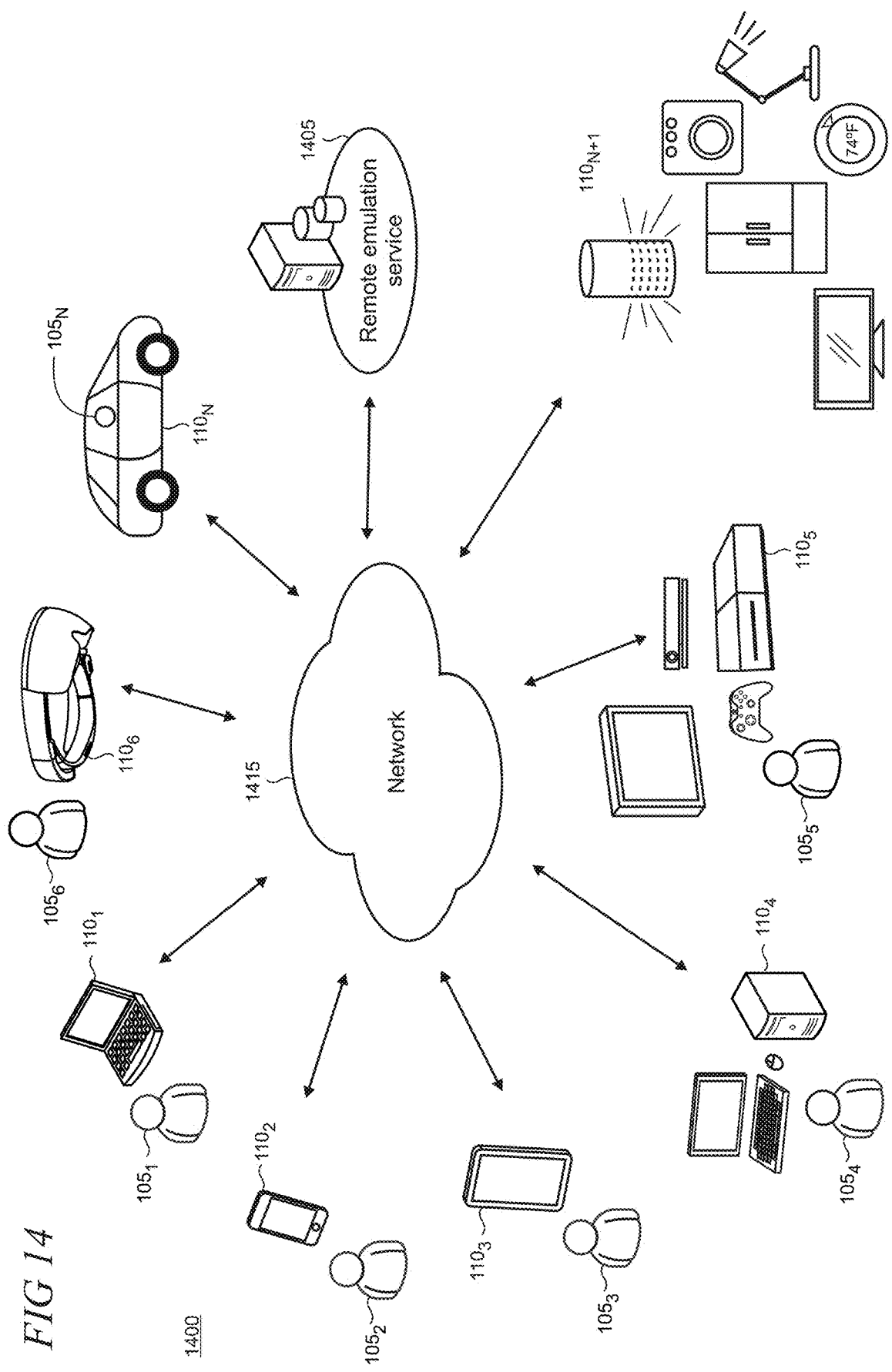
FIG. 14 shows an illustrative computing environment in which a remote emulation service is operative.

FIG. 14 shows an illustrative computing environment 1400 in which a remote emulation service 1405 is operative. In the computing environment 1400, the same or different users 105 may employ various devices 110 that communicate over a communications network 1415. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (e.g., video) calls, engage in messaging (e.g., texting) and email communications, use applications and access services that employ data, browse the World Wide Web, and the like.

Other types of electronic devices may also be usable within the environment 1400 including handheld computing devices, PDAs (personal digital assistants), portable media players, devices that use headsets and earphones (e.g., Bluetooth-compatible devices), phablet devices (e.g., combination smartphone/tablet devices), wearable computing devices such as head-mounted display (HMD) systems and smartwatches, navigation devices such as GPS (Global Positioning System) systems, laptop PCs (personal computers), smart speakers, IoT (Internet of Things) devices, smart appliances, connected car devices, smart home hubs and controllers, desktop computers, multimedia consoles, gaming systems, or the like. In the discussion that follows, the use of the term "device" is intended to cover all devices that are configured with communication capabilities and are capable of connectivity to the communications network 1415.

The various devices 110 in the environment 1400 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

The devices 110 can typically utilize the network 1415 in order to access and/or implement various user experiences. The network can include any of a variety of network types and network infrastructure in various combinations or subcombinations including cellular networks, satellite networks, IP (Internet-Protocol) networks such as Wi-Fi under IEEE 802.11 and Ethernet networks under IEEE 802.3, a public switched telephone network (PSTN), and/or short-range networks such as Bluetooth® networks. The network infrastructure can be supported, for example, by mobile operators, enterprises, Internet service providers (ISPs), telephone service providers, data service providers, and the like.

The network 1415 may utilize portions of the Internet (not shown) or include interfaces that support a connection to the Internet so that the devices 110 can access content and render user experiences provided by various remote or cloud-based application services and websites (not shown). The application services and websites can support a diversity of features, services, and user experiences such as social networking, mapping, news and information, entertainment, travel, productivity, finance, etc.

The remote emulation service 1405 may be configured to provide the present memory access widening for the computing devices 110 as a remote service. For example, one or more of the computing devices 110 may employ RISC-based processors that do not support unaligned memory access as described above, but non-native application support is still desired. In some cases, for example, a given device may not have enough resources to perform the memory access widening locally, or such local processing is not desirable. In such cases, features provided by the emulator 405 (FIG. 4) may be supported by one or more virtual machines that execute as part of the service 1405. In other cases, the emulator 405 can be instantiated locally, or utilize a combination of remote and local processing to implement the present memory access widening.

Figure 15:
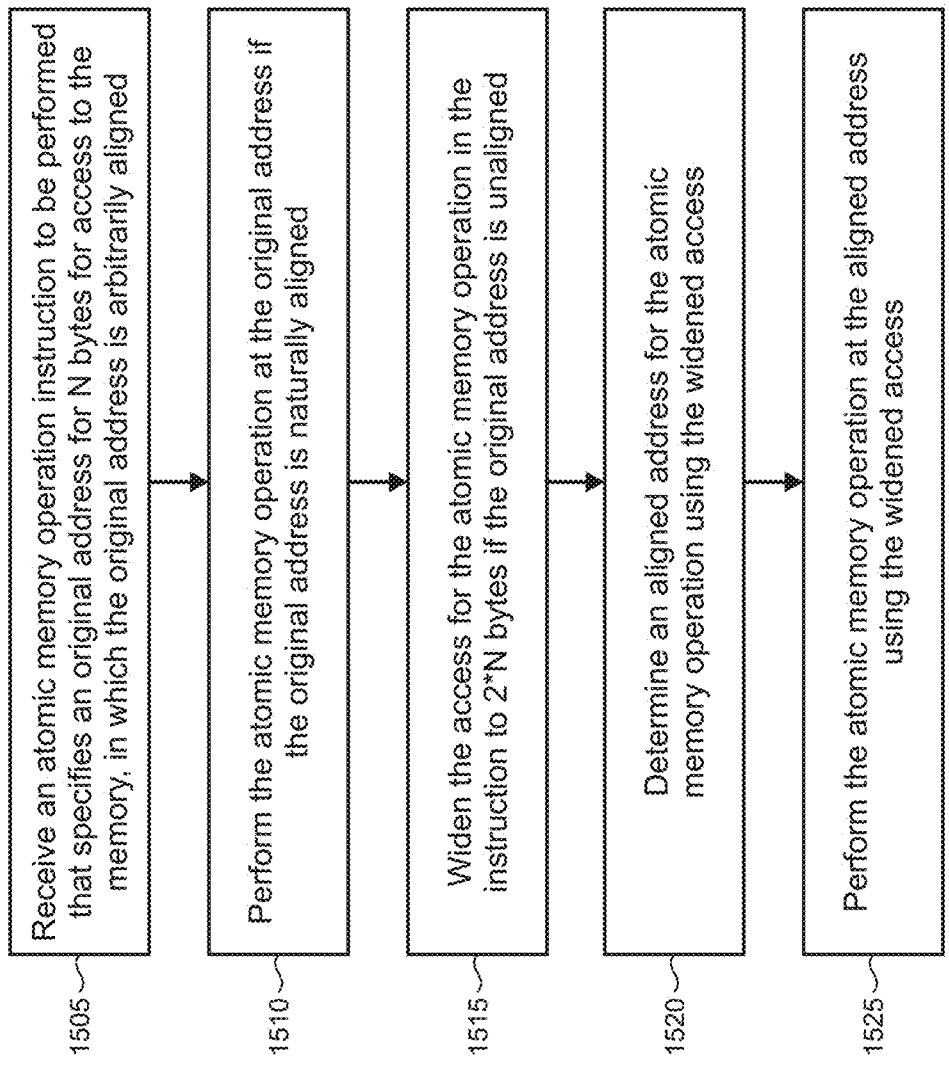
FIGS. 15, 16, and 17 are flowcharts of illustrative methods of the present widening of memory access to an aligned address for unaligned memory operations.

FIG. 15 is a flowchart 1500 of an illustrative method for performing unaligned atomic memory operations on shared memory using a processor that utilizes aligned access to a memory. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At step 1505, an atomic memory operation instruction to be performed that specifies an original address for N bytes for access to the memory is received, in which the original address is arbitrarily aligned. At step 1510, the atomic memory operation is performed at the original address if the original address is naturally aligned. At step 1515, access is widened for the atomic memory operation in the instruction to 2*N bytes if the original address is unaligned. At step 1520, an aligned address is determined for the atomic memory operation using the widened access. At step 1525, the atomic memory operation is performed at the aligned address using the widened access.

Figure 16:
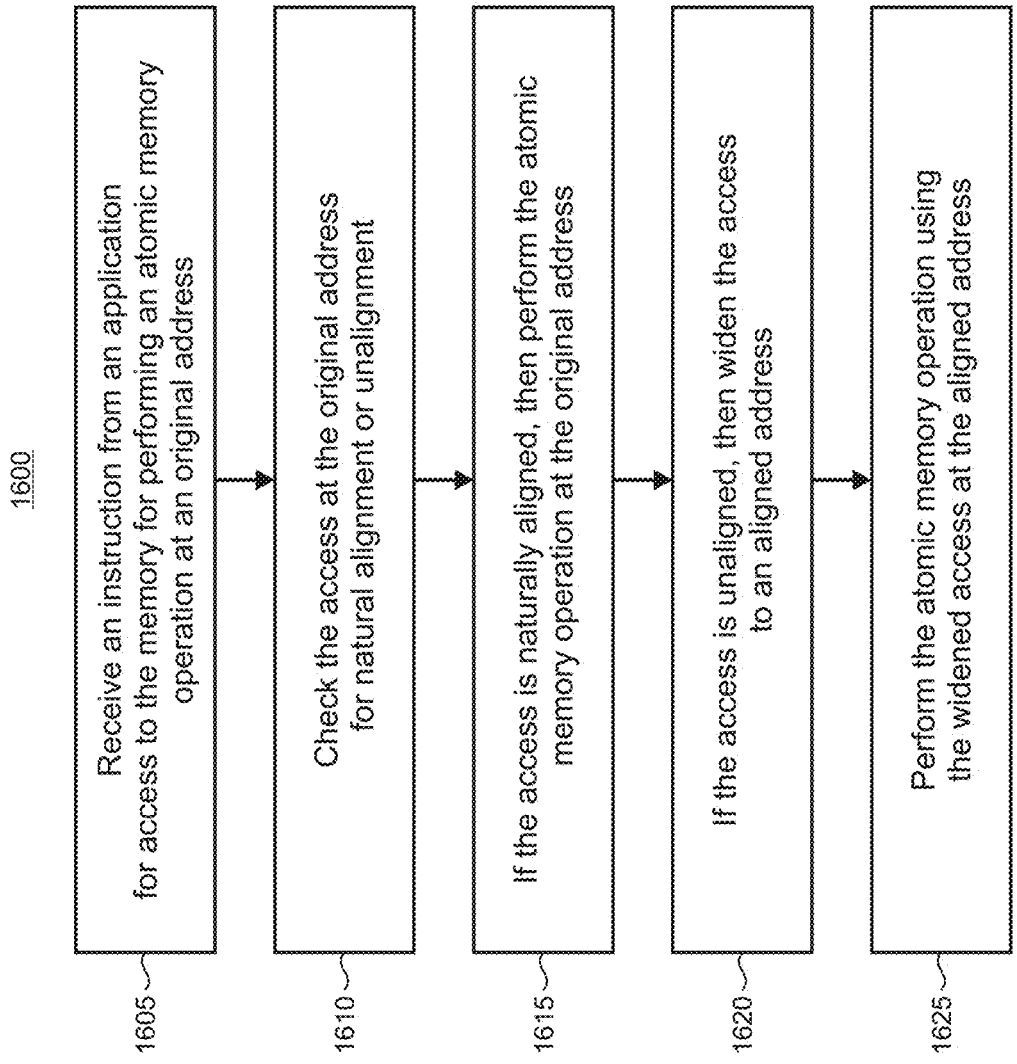

FIG. 16 is a flowchart 1600 of an illustrative method that may be performed by a computing device configured to perform unaligned atomic memory operations on shared memory. At step 1605, an instruction is received from an application for access to the memory for performing an atomic memory operation at an original address. At step 1610, the access at the original address is checked for natural alignment or unalignment. At step 1615, if the access is naturally aligned, then the atomic memory operation is performed at the original address. At step 1620, if the access is unaligned, then the access is widened to an aligned address. At step 1625, the atomic memory operation is performed using the widened access at the aligned address.

Figure 17:
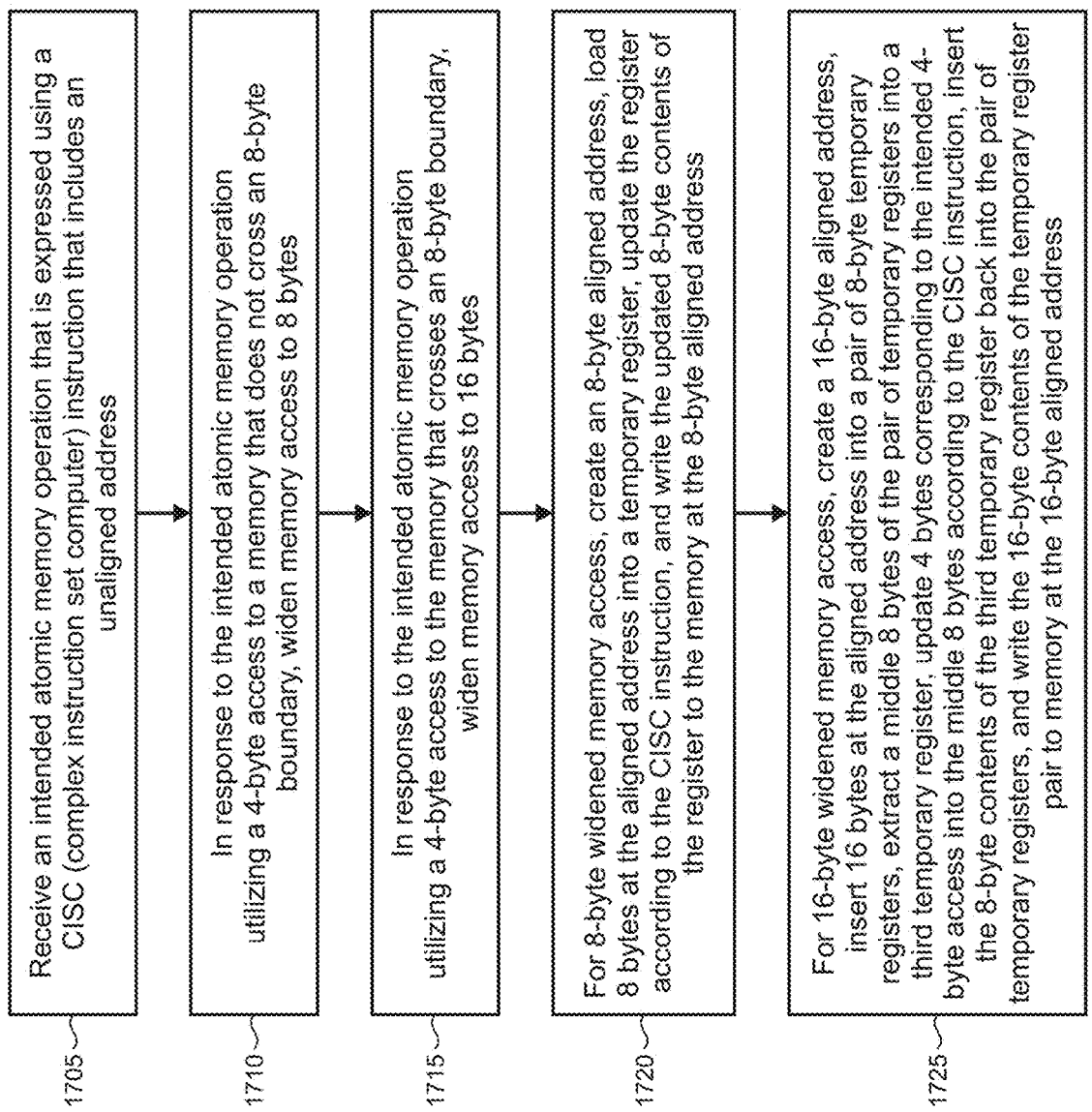

FIG. 17 is a flowchart 1700 of an illustrative method that may be performed by one or more RISC processors in a computing device that execute instructions stored on one or more hardware-based non-transitory computer-readable storage media. At step 1705, an intended atomic memory operation that is expressed using a CISC instruction that includes an unaligned address is received. At step 1710, in response to the intended atomic memory operation utilizing a 4-byte access to a memory not crossing an 8-byte boundary, memory access is widened to 8 bytes. At step 1715, in response to the intended atomic memory operation utilizing a 4-byte access to the memory that crosses an 8-byte boundary, memory access is widened to 16 bytes. In step 1720, for 8-byte widened memory access, an 8-byte aligned address is created, 8 bytes at the aligned address are loaded into a temporary register, the register is updated according to the CISC instruction, and the updated 8-byte contents of the register are written to the memory at the 8-byte aligned address. At step 1725, for 16-byte widened memory access, a 16-byte aligned address is created, 16 bytes at the aligned address are inserted into a pair of 8-byte temporary registers, a middle 8 bytes of the pair of temporary registers are extracted into a third temporary register, 4 bytes corresponding to the intended 4-byte access are updated into the middle 8 bytes according to the CISC instruction, the updated 8-byte contents of the third temporary register are inserted back into the pair of temporary registers, and the updated 16-byte contents of the temporary register pair are written to memory at the 16-byte aligned address.

Figure 18:
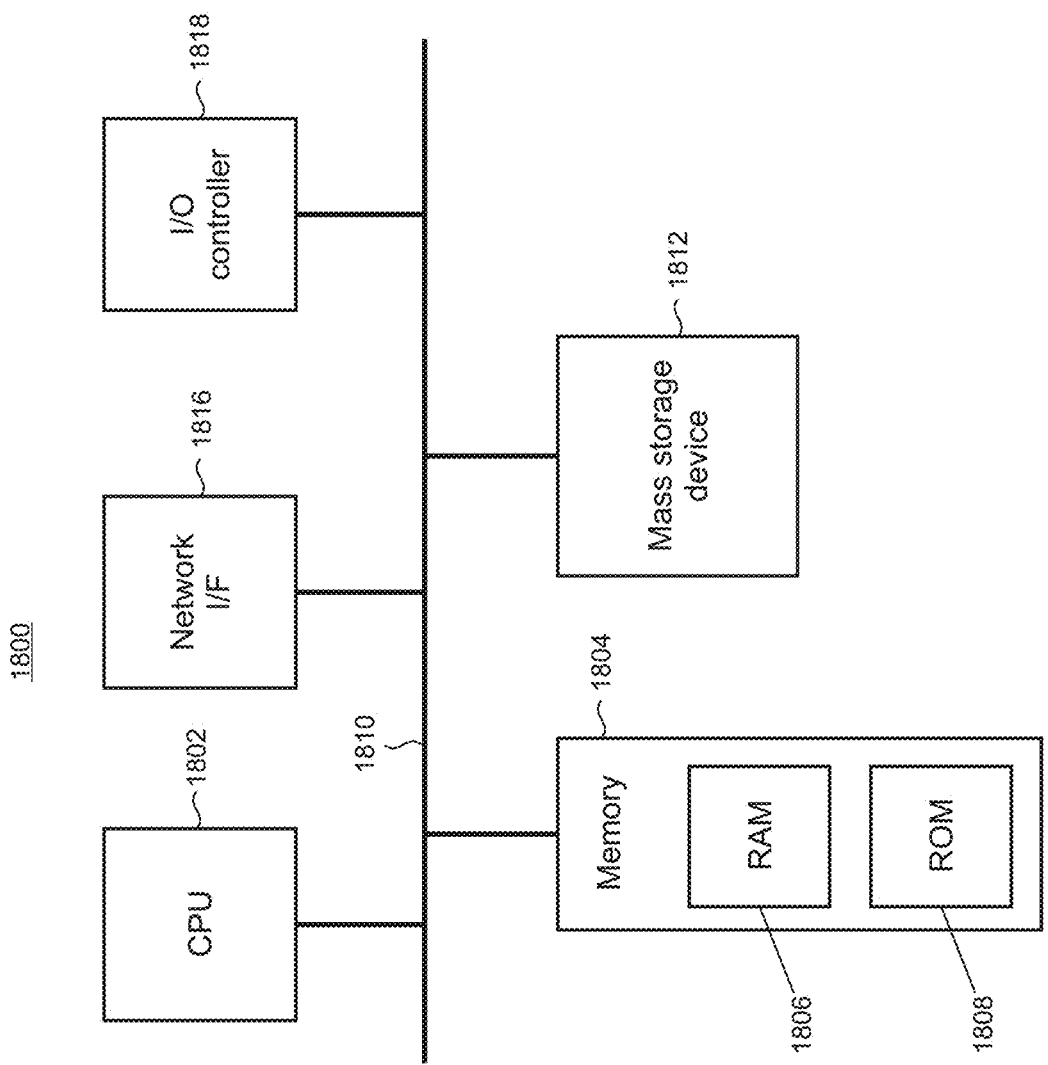
FIG. 18 is a block diagram of an illustrative computing device architecture that may be used at least in part to implement the present widening of memory access to an aligned address for unaligned memory operations.

FIG. 18 shows an illustrative architecture 1800 for a device, such as a server, capable of executing the various components described herein for widening memory access. The architecture 1800 illustrated in FIG. 18 includes one or more processors 1802 (e.g., central processing unit, dedicated AI chip, graphics processing unit, etc.), a system memory 1804, including RAM (random access memory) 1806 and ROM (read only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device 1812 for storing software code or other computer-executed code that is utilized to implement applications, the file system, and the operating system. The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, control devices such as buttons and switches or electronic stylus (not shown in FIG. 18). Similarly, the input/output controller 1818 may provide output to a display screen, user interface, a printer, or other type of output device (also not shown in FIG. 18).

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine, in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Figure 19:
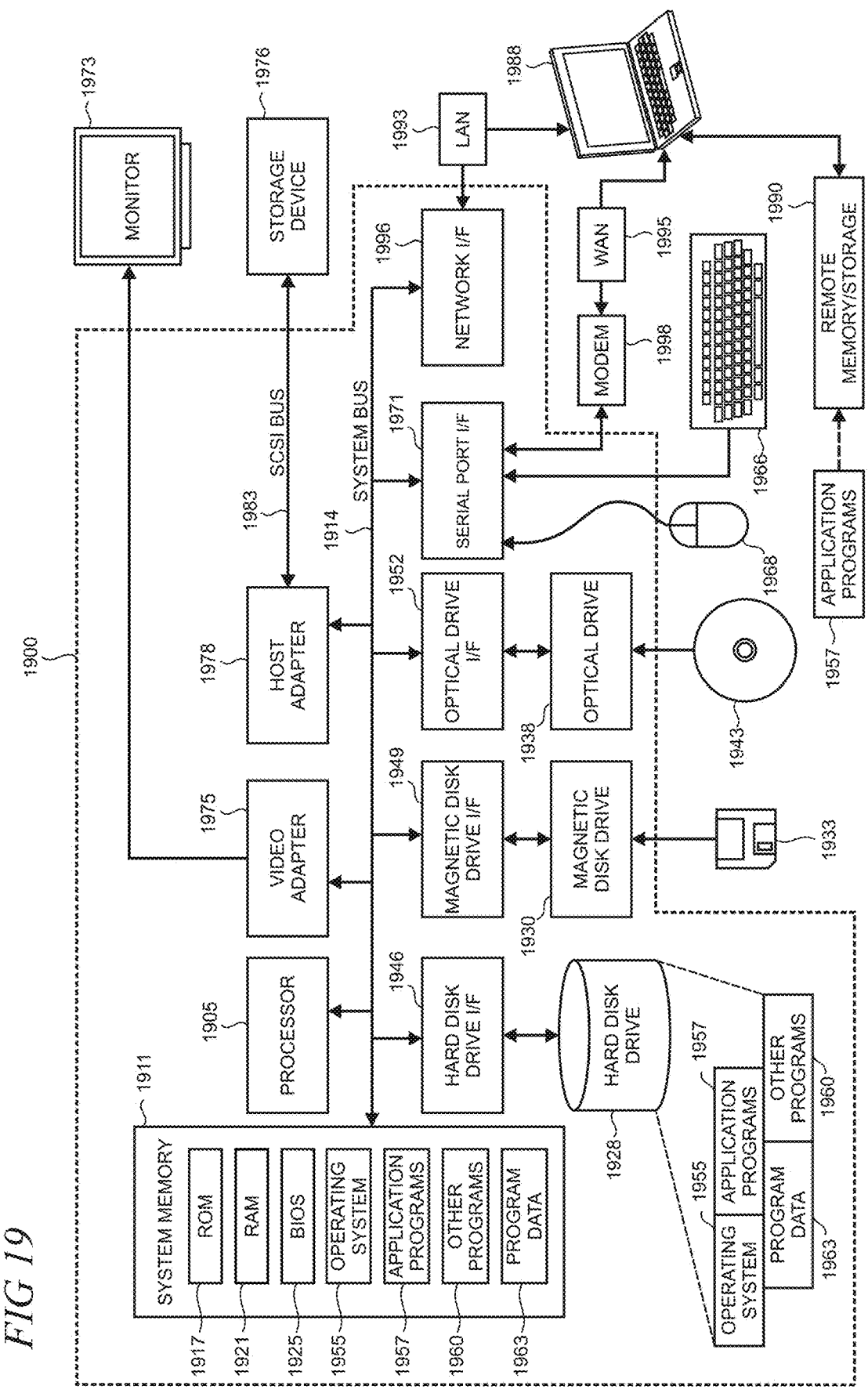
FIG. 19 is a simplified block diagram of an illustrative computing device that may be used at least in part to implement the present widening of memory access to an aligned address for unaligned memory operations.

FIG. 19 is a simplified block diagram of an illustrative computing device 1900 such as a PC, client machine, or server with which the present widening of memory access to an aligned address for unaligned memory operations may be implemented. Computing device 1900 includes a processor 1905, a system memory 1911, and a system bus 1914 that couples various system components including the system memory 1911 to the processor 1905. The system bus 1914 may be any of several types of bus structures including a memory bus or memory controller, a peripheral bus, or a local bus using any of a variety of bus architectures. The system memory 1911 includes read only memory (ROM) 1917 and random access memory (RAM) 1921. A basic input/output system (BIOS) 1925, containing the basic routines that help to transfer information between elements within the computing device 1900, such as during startup, is stored in ROM 1917. The computing device 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer-readable storage media provide non-volatile storage of computer-readable instructions, data structures, program modules, and other data for the computing device 1900. Although this illustrative example includes a hard disk, a removable magnetic disk 1933, and a removable optical disk 1943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present memory access widening to an aligned address for unaligned memory operations. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1933, optical disk 1943, ROM 1917, or RAM 1921, including an operating system 1955, one or more application programs 1957, other program modules 1960, and program data 1963. A user may enter commands and information into the computing device 1900 through input devices such as a keyboard 1966 and pointing device 1968 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1905 through a serial port interface 1971 that is coupled to the system bus 1914, but may be connected by other interfaces, such as a parallel port, game port, or universal serial bus (USB). A monitor 1973 or other type of display device is also connected to the system bus 1914 via an interface, such as a video adapter 1975. In addition to the monitor 1973, personal computers typically include other peripheral output devices (not shown), such as speakers and printers. The illustrative example shown in FIG. 19 also includes a host adapter 1978, a Small Computer System Interface (SCSI) bus 1983, and an external storage device 1976 connected to the SCSI bus 1983.

The computing device 1900 is operable in a networked environment using logical connections to one or more remote computers, such as a remote computer 1988. The remote computer 1988 may be selected as another personal computer, a server, a router, a network PC, a peer device, or other common network node, and typically includes many or all of the elements described above relative to the computing device 1900, although only a single representative remote memory/storage device 1990 is shown in FIG. 19. The logical connections depicted in FIG. 19 include a local area network (LAN) 1993 and a wide area network (WAN) 1995. Such networking environments are often deployed, for example, in offices, enterprise-wide computer networks, intranets, and the Internet.

When used in a LAN networking environment, the computing device 1900 is connected to the local area network 1993 through a network interface or adapter 1996. When used in a WAN networking environment, the computing device 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computing device 1900, or portions thereof, may be stored in the remote memory storage device 1990. It is noted that the network connections shown in FIG. 19 are illustrative and other means of establishing a communications link between the computers may be used depending on the specific requirements of an application of the present memory access widening to an aligned address for unaligned memory operations.

Various exemplary embodiments of the present widening memory access to an aligned address for unaligned memory operations are now presented by way of illustration and not as an exhaustive list of all embodiments. An example includes one or more hardware-based non-transitory computer readable memory devices storing computer-executable instructions which, upon execution by one or more RISC (reduced instruction set computer) processors in a computing device, cause the computing device to: receive an intended atomic memory operation that is expressed using a CISC (complex instruction set computer) instruction that includes an unaligned original address; in response to the intended atomic memory operation utilizing a 4-byte access to a memory that does not cross an 8-byte boundary, widen memory access to 8 bytes; in response to the intended atomic memory operation utilizing a 4-byte access to the memory that crosses an 8-byte boundary, widen memory access to 16 bytes; for 8-byte widened memory access, create an 8-byte aligned address, load 8 bytes at the aligned address into a temporary register, update the register according to the CISC instruction, and write the updated 8-byte contents of the register to the memory at the 8-byte aligned address; and for 16-byte widened memory access, create a 16-byte aligned address, insert 16 bytes at the aligned address into a pair of 8-byte temporary registers, extract a middle 8 bytes of the pair of temporary registers into a third temporary register, update 4 bytes corresponding to the intended 4-byte access into the middle 8 bytes according to the CISC instruction, insert the 8-byte contents of the third temporary register back into the pair of temporary registers, and write the 16-byte contents of the temporary register pair to memory at the 16-byte aligned address.

In another example, the CISC instruction comprises one or more of XCHG, XADD, CMPXCHG, or CMPXCHG8B. In another example, the instructions further cause the computing device to receive an intended atomic memory operation utilizing 4-byte or 8-byte access to the memory that is expressed using a CISC instruction that includes an aligned original address and perform the atomic memory operation at the aligned original address. In another example, the instructions further cause the computing device to, in response to the intended atomic memory operation utilizing an 8-byte access to the memory and an original 8-byte address being 4 modulo 16, create a 16-byte aligned address, insert 16 bytes at the aligned address into a pair of 8-byte temporary registers, extract a middle 8 bytes of the pair of temporary registers into the third temporary register, update the middle 8 bytes according to the CISC instruction, insert the updated 8-byte contents of the third temporary register back into the pair of temporary register, and write the updated 16-byte contents of the temporary register pair to memory at the 16-byte aligned address. In another example, the instructions further cause the computing device to perform the 8-byte atomic operation at the original address responsive to the original address not being 4 modulo 16.

A further example includes a method for performing unaligned atomic memory operations on shared memory using a processor that utilizes aligned access to a memory, comprising: receiving an atomic memory operation instruction to be performed that specifies an original address for N bytes for access to the memory, in which the original address is arbitrarily aligned; performing the atomic memory operation at the original address if the original address is naturally aligned; widening the access for the atomic memory operation in the instruction to 2*N bytes if the original address is unaligned; determining an aligned address for the atomic memory operation using the widened access; and performing the atomic memory operation at the aligned address using the widened access.

In another example, the natural alignment comprises an N byte access being aligned on an address boundary of N for the memory. In another example, the received atomic memory operation instruction is compliant with a register-memory instruction set architecture. In another example, the widening is implemented using data processing operations that are compliant with a load-store instruction set architecture, the data processing operations including one of bitfield manipulation, shift, or rotate. In another example, the performed atomic memory operation utilizes Load-Link/Store-Conditional instructions to write to the widened memory access. In another example, the method further includes observing exceptions thrown but not handled by an exception handler and using the original address for exception reporting to a record and not using the aligned address. In another example, the aligned address is rounded down to a multiple of $2^W$ responsive to the original address spanning a $2^W$ boundary in the memory where W is a size in bytes of a maximum atomic memory operation that is performable on the processor. In another example, the method is performed in one of application, operating system, emulator, remote service, or combination thereof.

A further example includes a computing device configured to perform unaligned atomic memory operations on shared memory, comprising: at least one processor that is configured with an instruction set architecture comprising an atomic instruction that requires an aligned memory access; at least one non-transitory memory; and at least one non-transitory computer-readable storage media having computer-executable instructions stored thereon which, when executed by the least one processor, cause the computing device to receive an instruction from an application for access to the memory for performing an atomic memory operation at an original address, check the access at the original address for natural alignment or unalignment, if the access is naturally aligned, then perform the atomic memory operation at the original address, if the access is unaligned, then widen the access to an aligned address, and perform the atomic memory operation using the widened access at the aligned address.

In another example, the application is non-native to the instruction set architecture that is applicable to the processor. In another example, the application employs a CISC (complex instruction set computer) instruction set architecture, and the processor employs a RISC (reduced instruction set computer) instruction set architecture or the processor is configured to utilize compare-and-swap instructions.

In another example, the instructions further cause the computing device to implement an exception handler that is configured to perform the atomic memory operation in view of a thrown exception using internal emulation and log the exception using the original fault-causing address. In another example, the widened access is a next larger power of two of the access in the original address. In another example, the instructions further cause the computing device to update only bytes associated with the original address in accordance with the atomic memory operation instruction. In another example, the application is remotely instantiated from the computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more hardware-based non-transitory computer readable memory devices storing computer-executable instructions which, upon execution by one or more RISC (reduced instruction set computer) processors in a computing device, cause the computing device to:
    receive an intended atomic memory operation that is expressed using a CISC (complex instruction set computer) instruction that includes an unaligned original address;
    in response to the intended atomic memory operation utilizing a 4-byte access to a memory that does not cross an 8-byte boundary, widen memory access to 8 bytes;
    in response to the intended atomic memory operation utilizing a 4-byte access to the memory that crosses an 8-byte boundary, widen memory access to 16 bytes;
    for 8-byte widened memory access, create an 8-byte aligned address, load 8 bytes at the aligned address into a temporary register, update the register according to the CISC instruction, and write the updated 8-byte contents of the register to the memory at the 8-byte aligned address; and
    for 16-byte widened memory access, create a 16-byte aligned address, insert 16 bytes at the aligned address into a pair of 8-byte temporary registers, extract a middle 8 bytes of the pair of temporary registers into a third temporary register, update 4 bytes corresponding to the intended 4-byte access into the middle 8 bytes according to the CISC instruction, insert the 8-byte contents of the third temporary register back into the pair of temporary registers, and write the 16-byte contents of the temporary register pair to memory at the 16-byte aligned address.

2. The one or more hardware-based non-transitory computer-readable memory devices of claim 1 in which the CISC instruction comprises one or more of XCHG, XADD, CMPXCHG, or CMPXCHG8B.

3. The one or more hardware-based non-transitory computer-readable memory devices of claim 1 in which the instructions further cause the computing device to receive an intended atomic memory operation utilizing 4-byte or 8-byte access to the memory that is expressed using a CISC instruction that includes an aligned original address and perform the atomic memory operation at the aligned original address.

4. The one or more hardware-based non-transitory computer-readable memory devices of claim 1 in which the instructions further cause the computing device to, in response to the intended atomic memory operation utilizing an 8-byte access to the memory and an original 8-byte address being 4 modulo 16, create a 16-byte aligned address, insert 16 bytes at the aligned address into a pair of 8-byte temporary registers, extract a middle 8 bytes of the pair of temporary registers into the third temporary register, update the middle 8 bytes according to the CISC instruction, insert the updated 8-byte contents of the third temporary register back into the pair of temporary register, and write the updated 16-byte contents of the temporary register pair to memory at the 16-byte aligned address.

5. The one or more hardware-based non-transitory computer-readable memory devices of claim 4 in which the instructions further cause the computing device to perform the 8-byte atomic operation at the original address responsive to the original address not being 4 modulo 16.

6. A method for emulating atomic memory operations comprising read-modify-write commands to shared data in a memory on a processor that utilizes aligned access to the memory, comprising:
    receiving, at the processor, an atomic memory operation instruction to be performed that specifies an original address for N bytes for access to the memory, in which the original address is arbitrarily aligned;
    performing, at the processor, the atomic memory operations comprising reading, modifying, and writing data at the original address if the original address is naturally aligned;
    widening, at the processor, the access for the atomic memory operations in the instruction to 2*N bytes if the original address is unaligned;
    determining, at the processor, an aligned address for the atomic memory operations with the widened access, in which the aligned address with widened access includes the original address; and
    performing, at the processor, the atomic memory operations at the aligned address using the widened access, wherein the atomic memory operations performed by the processor comprise
        reading data at the aligned address with the widened access,
        from the data read at the aligned address with the widened access, modifying the data at the original address, and
        writing data back to the aligned address with the widened access, in which the modified data is written to the original address.

7. The method of claim 6 in which the natural alignment comprises an N byte access being aligned on an address boundary of N for the memory.

8. The method of claim 6 in which the received atomic memory operation instruction is compliant with a register-memory instruction set architecture.

9. The method of claim 6 in which the widening is implemented using data processing operations that are compliant with a load-store instruction set architecture, the data processing operations including one of bitfield manipulation, shift, or rotate.

10. The method of claim 6 in which the performed atomic memory operation utilizes Load-Link/Store-Conditional instructions to write to the widened memory access.

11. The method of claim 6 further including observing exceptions thrown but not handled by an exception handler and using the original address for exception reporting to a record and not using the aligned address.

12. The method of claim 6 in which the aligned address is rounded down to a multiple of 2^W responsive to the original address spanning a 2^W boundary in the memory where 2^W is a size in bytes of a maximum atomic memory operation that is performable on the processor.

13. The method of claim 6 in which the received instruction includes a lock prefix which indicates that the received instruction is to be executed atomically by the processor.

14. A computing device configured to emulate unaligned atomic memory operations on shared data in a memory, comprising:
   a processor that is configured with an instruction set architecture comprising an atomic instruction that requires an aligned memory access;
   at least one non-transitory memory; and
   at least one non-transitory computer-readable storage media having computer-executable instructions stored thereon which, when executed by the processor, cause the processor to
   receive an instruction from an application for access to the memory for performing atomic memory operations at an original address comprising read-modify-write commands to the shared data,
   check the access at the original address for natural alignment or unalignment,
   if the access is naturally aligned, then perform the atomic memory operations at the original address,
   if the access is unaligned, then widen the access to an aligned address, in which the aligned address with widened access includes the original address, and
   perform the atomic memory operations using the widened access at the aligned address, wherein the atomic memory operations performed by the processor comprise
   reading data at the aligned address with the widened access,
   from the data read at the aligned address with the widened access, modifying the data at the original address, and
   writing data back to the aligned address with the widened access, in which the modified data is written to the original address.

15. The computing device of claim 14 in which the application is non-native to the instruction set architecture that is applicable to the processor.

16. The computing device of claim 15 in which the application employs a CISC (complex instruction set computer) instruction set architecture, and the processor employs a RISC (reduced instruction set computer) instruction set architecture or the processor is configured to utilize compare-and-swap instructions.

17. The computing device of claim 14 in which the instructions further cause the computing device to implement an exception handler that is configured to perform the atomic memory operation in view of a thrown exception using internal emulation and log the exception using the original fault-causing address.

18. The computing device of claim 17 in which the widened access is a next larger power of two of the access in the original address.

19. The computing device of claim 18 in which the instructions further cause the computing device to update only bytes associated with the original address in accordance with the atomic memory operation instruction.

20. The computing device of claim 14 in which the received instruction includes a lock prefix which indicates that the received instruction is to be executed atomically by the processor.

* * * * *